United States Patent [19]

Wright et al.

[11] Patent Number: 5,453,933
[45] Date of Patent: Sep. 26, 1995

[54] CNC CONTROL SYSTEM

[75] Inventors: Michael R. Wright, Indianapolis; David E. Platts, Plainfeild; Daniel B. French, Carmel; Gerald Traicoff, Indianapolis; Michael A. Dupont, Fishers; Gregory A. Head, Plainfield, all of Ind.

[73] Assignee: Hurco Companies, Inc., Indianapolis, Ind.

[21] Appl. No.: 118,445

[22] Filed: Sep. 8, 1993

[51] Int. Cl.$^6$ ................................................. G06F 15/46
[52] U.S. Cl. ................ 364/474.23; 364/191; 364/474.24
[58] Field of Search .................. 364/474.22, 474.23, 364/474.24, 468, 188–193, 474.15, 474.16, 474.17, 474.26

[56] References Cited

U.S. PATENT DOCUMENTS

| | | | |
|---|---|---|---|
| 4,477,754 | 10/1984 | Roch et al. | 364/474.22 |
| 4,823,253 | 4/1989 | Shima | 364/167 |
| 4,885,717 | 12/1989 | Beck et al. | 364/900 |
| 4,939,635 | 7/1990 | Seki | 364/191 |
| 5,079,713 | 1/1992 | Kawamura | 364/474 |
| 5,095,522 | 3/1992 | Fujita et al. | 395/200 |
| 5,150,303 | 9/1992 | Fukaya | 364/474 |
| 5,168,441 | 12/1992 | Onarheim et al. | 364/146 |
| 5,177,689 | 1/1993 | Kinasi | 364/474 |
| 5,181,162 | 1/1993 | Smith et al. | 364/419 |
| 5,212,767 | 5/1993 | Baker et al. | 395/600 |
| 5,235,701 | 8/1993 | Ohler et al. | 395/600 |
| 5,237,654 | 8/1993 | Schackelford et al. | 395/160 |
| 5,239,477 | 8/1993 | Matsumura | 364/474 |
| 5,247,447 | 9/1993 | Korncoff et al. | 364/468 |
| 5,272,642 | 12/1993 | Suzuki | 364/474.24 |

OTHER PUBLICATIONS

International Search Report, Jan. 11, 1995.
Article entitled "Object Oriented Programming for Motion Control", D. E. Halpert (1991).
Article entitled "MMS:MAP Application Services for the Manufacturing Industry", Brill and Gramm, Jul. 1991.
Ultimax Programming, Hurco Manufacturing Co., Inc., instruction manual, Hurco Part No. 704–0001–598, Oct., 1992, Revision C.

*Primary Examiner*—Roy N. Envall, Jr.
*Assistant Examiner*—Thomas E. Brown
*Attorney, Agent, or Firm*—Baker & Daniels

[57] ABSTRACT

A CNC machine tool control system that includes a controllable, movable tool for shaping a workpiece, a mechanism for receiving control instructions describing shaping functions to be performed on the workpiece, a processing unit and memory. The control systems includes objects defined according to an object oriented design. One type of object is a model of a shaping process to be performed on a workpiece, including informational parameters regarding the physical dimensions of the shape resulting from the process. The process objects communicates through an object oriented messaging system to machine objects, which represent physical devices present on the CNC machine on which the control system operates. The system also includes object oriented motion control and exception handler objects, each of which may communication with other object via object oriented messages. The control system permits easy modifications to the control system by persons with limited knowledge about the entire control system, and is readily adaptable to advances in new CNC machine tools.

38 Claims, 2 Drawing Sheets

(39 Microfiche, 2419 Pages)

CNC CONTROL SYSTEM

MICROFICHE APPENDIX

This application includes a microfiche appendix having 39 frames.

FIELD OF THE INVENTION

This invention relates to computer numeric controlled (CNC) machine tools, and in particular, to the control systems used to operate such machine tools.

BACKGROUND OF THE INVENTION

CNC Control Systems

The purpose of a CNC machine is to use a set of input specifications describing a physical object to produce a machined part according to the specifications. The part is typically formed from solid block stock material such as metal, and shaped by various machine tools such as drills, mills, lathes, electrostatic discharge machines (EDMs), gauging systems and the like. CNC machines are complex and include hundreds of components. Examples of input devices include keyboards, operator consoles, pressure sensitive CRTs, various tools and machine sensors, limit switches and network interfaces. Output devices include motion controllers that send motion control signals to motors driving axes or a tool, CRT displays, console status lights and audible alarms. Other components include microprocessors, memory, disk drives, data buses and wiring harnesses. The software executed by the computer processor is a critical component of a CNC machine, as it coordinates the functions of the all the other components of the system. In general, CNC software is custom written for the particular brand of components a CNC manufacturer or system integrator chooses to include in the CNC machine. As a result, CNC software is extremely complex, and a software programmer for a particular CNC machine must be intimately familiar with the way virtually every hardware component interfaces with the software, and with the entire software system itself.

For example, two representative functions of most CNC software are the logic and motion control functions (collectively referred to herein as the "kernel"). The logic control function keeps track of the specific sequence of steps that must be taken by various movable hardware components to accomplish a task. For example, the steps required to mount a differently sized drill bit into the tool holder of a spindle from an automatic tool changer in a milling application might be: (1) send a command to raise the spindle containing the currently mounted drill bit so the tool changer will fit underneath it, (2) send a command to the tool changer instructing it to move below the spindle, (3) send a command to the spindle instructing it to release the currently mounted drill bit, (4) wait for a signal from the spindle indicating that the drill bit has been released, (5) send a command to the tool changer instructing it to move to rotate clockwise 30 degrees to position the new drill bit below the spindle, (6) interrogate the tool changer to confirm that the tool changer has successfully executed the rotation command, (7) send a command to the spindle commanding it to engage the new drill bit underneath it in the tool changer, and (8) send a command to the tool changer instructing it move away from the spindle and work area. Given the hundreds of moving, controllable parts in a CNC machine tool, the logic control function is much more complex than the above simplified example illustrates.

The motion control function of the software receives commands describing how a particular axis or motor should be moved. For example, in the above example for logic control, the logic control function sent the motion control function a command to raise the spindle. The motion control function takes this "general" command, breaks it down into smaller, discrete movements (i.e. controllably move the spindle up 0.001" at a time until it has moved up a total of 6 inches), and sends and receive electric signals from precision motors to ensure the movement is carried out. The motion control function is also able to execute more complex, multi-dimensional commands, such as to move the axes of a milling machine in a pattern so as to cut an ellipse of specified dimensions in a workpiece.

Because the motion control function is the portion of the software (except for device drivers) that interacts most closely with the hardware components that actually carry out shaping processes on a workpiece, the motion control function also receives information about hardware faults from hardware devices. For example, if a hardware device is unable to execute an instruction, the motion control function will receive a notice of the error from the hardware (or its associated device driver). This information needs to be communicated back to the other portion of the CNC control software responsible for requesting the motion control function to complete the function the software is currently undertaking, so that appropriate action, such as displaying a message on the operator CRT, may occur. However, there are usually many other portions of the CNC control system software that will also need to be informed of the hardware fault. Moreover, the portions that need to know about the fault will vary depending on the exact fault. In past systems, the motion control function has been used to keep track of which portions of the CNC control system software must be notified of which hardware faults. This not only places an increased burden on the motion control portion of the CNC control system software, but also makes this portion more difficult to maintain.

Computer programmers writing CNC software have generally designed the entire software system using structured techniques that analyze what the entire CNC machine tool must do (functional decomposition). This has resulted in complex, difficult-to-modify software systems. For example, software code relating to the user interface by which a user describes a part to be machined, can be found in other portions of the CNC control system software, such as the motion controller. One example is that when a motion controller receives a signal from a machine tool indicating a fault condition (for example, when an object in the work area prevents the table from moving to a desired location, or a blown fuse), the motion controller might directly display an error message on the CRT display. Because prior CNC control system software generally is not broken down into portions corresponding to the discrete, physical components of a CNC machine tool, a change in one portion of the software is difficult to make and frequently requires changes to other portions of the software.

Another example illustrating this problem occurs when a user, system integrator or even machine tool manufacturer wishes to add a new hardware component to the machine tool. For example, it may be desirable to replace an AC induction motor with a DC brushless motor from a different manufacturer. The new motor will likely use a different communications protocol and have different tolerance specifications and operating limits. Therefore, the motion control software will need to be modified to be able to communicate with the new motor using its communications protocol. The user interface will also need to be modified so that the user may specify the improved tolerance parameters. However, with past CNC software, these changes will have a ripple effect throughout the entire software system, greatly increasing the time required to develop a new software system capable of using the new motor. Many of the additional revisions are caused by the fact that the data the software needs to access is dispersed throughout the entire software system. For example, to add a new software function, the software may need to know, what tool is presently in the spindle, the speed the spindle is rotating, the coordinates of the axes (location of the table), the readings of a thermal sensor, information about forces being exerted on the cutting spindle, and the stage (or step) of processing the workpiece is currently in. In past CNC systems, this information would likely be diffused throughout various software modules, and the way these data elements interact is either too complex to discern (execpt to the original software author), or proprietary.

These problems with CNC control systems have led to several other problems throughout the industry. There is a long lead time for system integrators or CNC machine tool manufacturers to be able to incorporate new hardware components into existing systems. This problem applies not only to new CNC machine designs, but also to efforts to add improved or additional components to an existing CNC machine tool, or to retrofit an existing machine tool with CNC capabilities. Another problem is that of scalability. Because CNC control software is usually written for use in accordance with an anticipated collection of hardware components, the same software can not be easily adapted for use in connection with other hardware components. In other words, CNC software is generally not "scalable," meaning that the software used to operate sophisticated, high-end CNC machines can not also be used to operate "bare-bones," low-end CNC machine tools. As a result, CNC manufacturers "reinvent" software having the same functionality merely because it designed to work in a CNC having different hardware components.

Programmers for CNC control systems can also be required to "reinvent" software components not just in response to new hardware, but also in response to new standards for inputting descriptions of parts to be formed by the CNC machine. The earliest CNC machines accepted part definitions through punched paper tape. Subsequent CNC machines (such as that disclosed in U.S. Pat. No. 4,477,754) interrogated a machine operator through a series of questions to obtain instructions about how to create a desired part. More recently, several standard data file formats have emerged for describing parts to be machined, such as the HURCO conversational or RS-274D M&G code programs. In the past "part program interpreter" modules of CNC control system programs, each module used for accepting a part definition in a different format, would generally have to access, as described above, various data elements and software routines diffused throughout the CNC control system software. Again, each different input format has resulted in a unique part program interpreter software program, and these programs all include much common, and therefore needlessly duplicative, functionality.

Object Oriented Software

Most existing programming languages provide "sequential" instructions for a processor to implement. These languages have previously been used to implement CNC control systems. However, computers are often utilized for modeling systems of interactive components in order to determine sequences of actions such systems would perform under various conditions. For example, a programmer may wish to program a computer to mimic the manner in which some particular digital logic network responds to a particular input stimulus. When the programmer doesn't know beforehand what sequence of steps the logic network would carry out in response to the stimulus, but only knows how each individual component changes its outputs in response to a change to its inputs, the programmer often finds it difficult to utilize sequentially organized instructions to program a computer to model the behavior of the system.

In contrast to sequentially organized software, "object-oriented" software is organized into "objects", each comprising a block of computer instructions describing various procedures ("methods") to be performed in response to "messages" sent to the object. Such operations include, for example, the manipulation of variables and the transmission of one or more messages to other objects. Messages are sent and received between objects having certain functions and knowledge to carry out processes. When one of the objects receives a message, the object carries out an operation (a message procedure) corresponding to the message and, if necessary, returns a result of the operation. Each object has a region where internal states (instance variables) of the object itself are stored and where the other objects are not allowed to access. The objects comprise concept objects that represent concepts and instance objects that represent instances of the concept objects. The concepts are clearly separated from the instances. One feature of the object-oriented system is inheritance. With respect to a certain concept object, there is defined an upper concept object that has a concept more abstract than a concept held by the certain concept object, and the certain object can inherit the functions (message procedures) and knowledge (instance variables) of the upper concept object to utilize them. For example, a concept object "circle" may inherit functions and knowledge from its upper concept object "shape."

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. A method of the object receiving the message may cause the object to respond, carrying out predetermined functions which may include sending messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

Object-oriented analysis and design methods permit reuse of system analysis and requirements from other products in the same family. Object-oriented software design means that software components are created from data and functions and are organized into objects. An object is an abstraction of something in the real world, reflecting the capabilities of a system to keep information about it, interact with it, or both. It is, therefore, an encapsulation of attribute values and their exclusive services. An object's attributes describe the object, but not how it works. The object's services are instructions, programs, procedures, or actions that describe what the object will do when something happens.

As described above, objects are grouped into classes. A class includes a description of how to create new objects in the class and establishes the basic variables that are common to all of its objects. New objects inherit these common characteristics from the parent class. This feature allows the software engineer to build on existing design and code by creating more specific objects from the easily reused code in the general class. For example, a software engineer can use a general class of characteristics for a "device" to create a model of a more specific device such as a spindle. Object-oriented analysis and design explicitly represent commonality in the system's objects and use inheritance to identify and capitalize on commonality of attributes and services. The system may only access data through the services, if at all. Services hide an object's data and send messages to perform operations. This isolates dependency on a particular data structure thus permitting new features to be added without changing the arrangement of the original objects. This structure protects the data from the damage that commonly occurs during changes in monolithic, proprietary systems.

OBJECTS OF THE INVENTION

One object of the invention is to provide a CNC machine tool control system that utilizes an object oriented program in which objects exchange object oriented messages.

Another object of the invention is to provide a CNC machine tool control system that is scalable such that it may be used for either high end or low end CNC machine tools.

Another object of the invention is to provide a CNC machine tool control that is easily modifiable, in which previously written software can be reused, and in which new objects can be added which inherit or comprise compositions of previously defined objects.

Another object of the invention is to provide a CNC machine tool control system in which new processes may be added by a programmer without requiring the programmer to know details of how particular hardware components carry out specific workpiece shaping processes.

SUMMARY OF THE INVENTION

Figure 1:
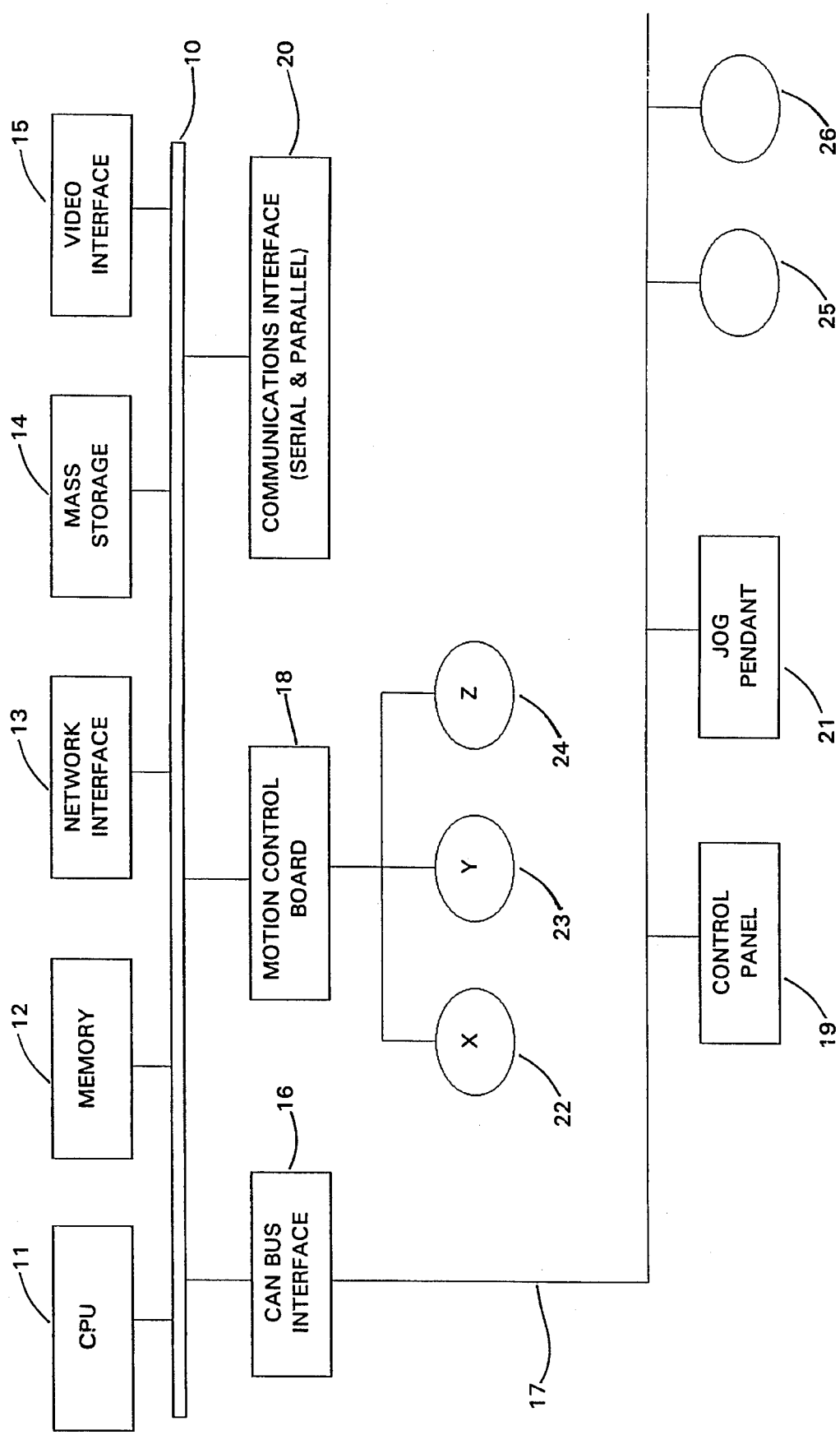
FIG. 1 is a schematic diagram of the hardware components of a CNC machine tool system on which the control system of the present invention may operate.

The control system of the present invention provides a real-time CNC software system that isolates system responsibilities into classes that permit a CNC manufacturer or system integrator to manage complexity and change. The control system allows different systems to be created from the same model and future, as yet unimagined, technological advances can be incorporated without redesigning or making massive changes.

The system utilizes an object-oriented software environment. A first class of object types is provided for processes (such as drilling, reaming, milling) to be carried out by machine tool components (the Process Class). Some processes objects may inherit characteristics of other objects in the Process class. For example, a "hole" object may have characteristics such as a depth and diameter, which can be inherited by other process objects, such as a drill, ream or bore process object. A second class of object types of is provided which represent instances of machine tool components, such as a table (axes), a spindle, tool changer or operator console. Again, some objects may inherit attributes of other objects. For example, an axis group, namely an object for simultaneously controlling multiple axes to shape complex three-dimensional objects, may be inherit attributes of a single axis object. Other objects may be composite objects of other tool objects. For example a tool changer may be a composite object of a collection of different milling bits which may be held in the tool changer (in addition to having its own attributes).

Most importantly, during execution of the software component of the control system, the objects transmit messages to each other. For example a drill process object can be defined to hold all the information needed to define a drilling process, and this information may be sent in a message to an Machine Class spindle object (to move the spindle down and form the hole) and to an axis group object (to position the workpiece in the proper location). However, the portion of the software which defines the drilling process does not need to access information regarding how the actual machine tool component carries out its task, or how the motion control module controls the machine components. Therefore, in a software implementation, the same process object can be used in virtually any CNC machine, without undue regard to its manufacturer or specific hardware components. Moreover, the object oriented messages through which various objects communicate provide a standard interface for adding additional functionality to a CNC machine tool control system.

For example, the primary purpose of a user interface is to collect information about a series of machining processes to be performed. Once the basic information is collected, the user interface can execute the processes by: (1) calling a process object with data about a new process to thereby create the object; (2) repeat step (1) for each process; and (3) sequentially sending a message to each defined object telling it to execute itself. Thus, the programmer of the user interface may be completely insulated from motion control data required for the machine tools to carry out their tasks.

Because communication between software objects is accomplished through messages, software functions can be more easily distributed among different, simultaneously executing tasks. For example, instead of a motion control module needing to keep track of which task needs information regarding a particular hardware fault, information regarding a fault may merely be sent to an exception handler object. This allows the motion control module to devote more processing time to its primary task of controlling motion, and permits all error conditions to be handled in a uniform manner. Specifically, the exception handler may keep a database of which objects have a need to know about which types of faults, and report specific faults only to those objects. Therefore, in adding a new process or machine component object to the system, modification of the motion control module can be kept to a minimum as fault conditions may be handled by the exception handler.

There are seven basic Classes of software components: Device Drivers, Operating System, Platform Services, the Kernel, Machine Class objects, Process Class objects, and the Operator Class. The Device Drivers class contains the interfaces to particular hardware such as the hard drive, floppy drive, serial and parallel ports, motion board, and I/O device. This isolates all hardware interfaces into a single class that only needs to be changed when new hardware components are added to the existing system components and need to communicate in a different manner with the system.

The Operating System class is responsible for hardware and software resource management. It manages memory, timers, and the scheduling of all processes and tasks. This class makes it possible to port a control system in accordance with the present invention system to other hardware platforms. The Platform Services class is responsible for facilitating the execution of tasks such as error handling and communication between part program interpreters and the lower levels of the system. This class simplifies system communications and only requires change if advances in computer science technology need to be incorporated because they improve the efficiency or change the management of initialization and message handling. The Kernel class handles continuous motion and discrete input/output implementation components. This class forms the stable core of the CNC control system that only needs to be changed when performance scaling is required. This approach is in sharp contrast to prior CNC control systems that require system developers to change the Kernel when making changes to the Operator Class objects, such as the Part Program Interpreter.

The remaining three classes (Machine, Process, and Operator) specifically tailor any system to be a machine tool CNC. The Operator and Process classes are the "tools" used to communicate clearly to the above hardware-oriented classes. The Machine class contains the objects that makes this communication understandable by the Kernel components.

The Machine class is a collection of objects that embody the abstraction of real-world components such as the tool changer, spindle, or coolant. This class describes all generic categories of machine tool devices by their basic required characteristics. Operator programs usually communicate through the objects in this class to the Kernel. The Machine class turns operator commands such as "change to tool #6" into a message or series of messages that can be understood by the Kernel's components. New machine tool components can be added to the Machine class and existing components can be easily modified without making changes to the Kernel.

The Process class holds the Process techniques (methods) that perform specific common practices on the specific type of machine (low-end milling machine, lathe, punch press, EDM, gauging system, etc.). The objects in this class use multiple Machine Class objects and can be accessed from multiple part program interpreter (operator) programs. This class usually contains libraries of canned cycles to handle such operations as milling frames, tapping, and boring, but it also contains any subroutine that several different applications need to use. The objects provide easy accessibility to the complex CNC features.

The Operator Class (including the Part Program Interpreter) is an extension of the CNC operator's skills and job functions. It also holds the operator programs such as part programming and system diagnostics. This class makes use of services provided by other classes to manage control of the machinery. Using programs at this level, the operator can set the system parameters (e.g., maximum feedrate) and communicate with the machine tool while it is running a part program. Most of the changes made to a CNC will be modifications to change what the operator can do. These changes usually affect the part programming and part cutting environment and can be made at this level with any accompanying techniques changed in the Process class.

Engineers changing a control system of the present invention can easily make changes to the system because they do not need to be experts on the entire system to make a modification to a single component in a class. One change does not have a ripple effect of change throughout the system. Portions of the system that are most likely to change such as the user interface and device drivers are separated from the Kernel. These components are more accessible to change through PLC programs, customizations to the Machine class and addition to or modification of operator programs.

Users of the control system of the present invention will have a more stable design that can be tested for completeness. The system makes possible the efficient reuse of system analysis, requirements, design, and components. The system forces system designers to consider all nearly all levels of CNC responsibilities to be handled by object-oriented software. In addition, changes at the Device Driver and Operating System levels may incorporate new technologies and at the Operator and Process levels will be changed to enhance or scale down system features and functionality. The core classes, Machine and Kernel, will change infrequently due to the "all purpose" nature of the objects in these two classes.

The present system uses an open systems, object-oriented design approach. This allows users to tailor hardware and software to gain the competitive edge. The CNC control system allows easy integration of hardware and software from different suppliers and permits the porting of systems to other hardware platforms. Industry standard hardware interfaces to simplify assembly and maintenance may be used. The system is dynamically reconfigurable to easily permit third party development of software components. The system uses simple, standard messages in a message schema. The messages are flexible and allow a user to select messages they want to use and to alter the messages to meet their needs. The system software is scalable to support less expensive and/or a full-featured CNC hardware system using the same software structure.

As with data characteristics, services can also be inherited from the parent class when a new class or object is created.

```
/* The message header includes information about the message itself */
typedef struct lc_header_type
{
int msg_size;       /* Length of message */
int header_size;    /* Length of header info */
lc_msg message;     /* The enumerated message number */
int transaction;    /* The message transaction number */
enum type;          /* The type of message (request / response):
0 = this is a request (set by sender)
1 = request received (set by receiver)
2 = request completed (set by receiver)
3 = request denied (set by receiver)
4 = no service available (set by receiver)        */
} lc_header_type;
```

Of course, the new class or object may use the service or create a different version of it. Different objects can use identical services. Therefore, a software engineer writes the code for the service only once and then reuses it after that. The reusability of existing object-oriented code makes development and modification faster because there is less to write and maintain.

Figure 2:
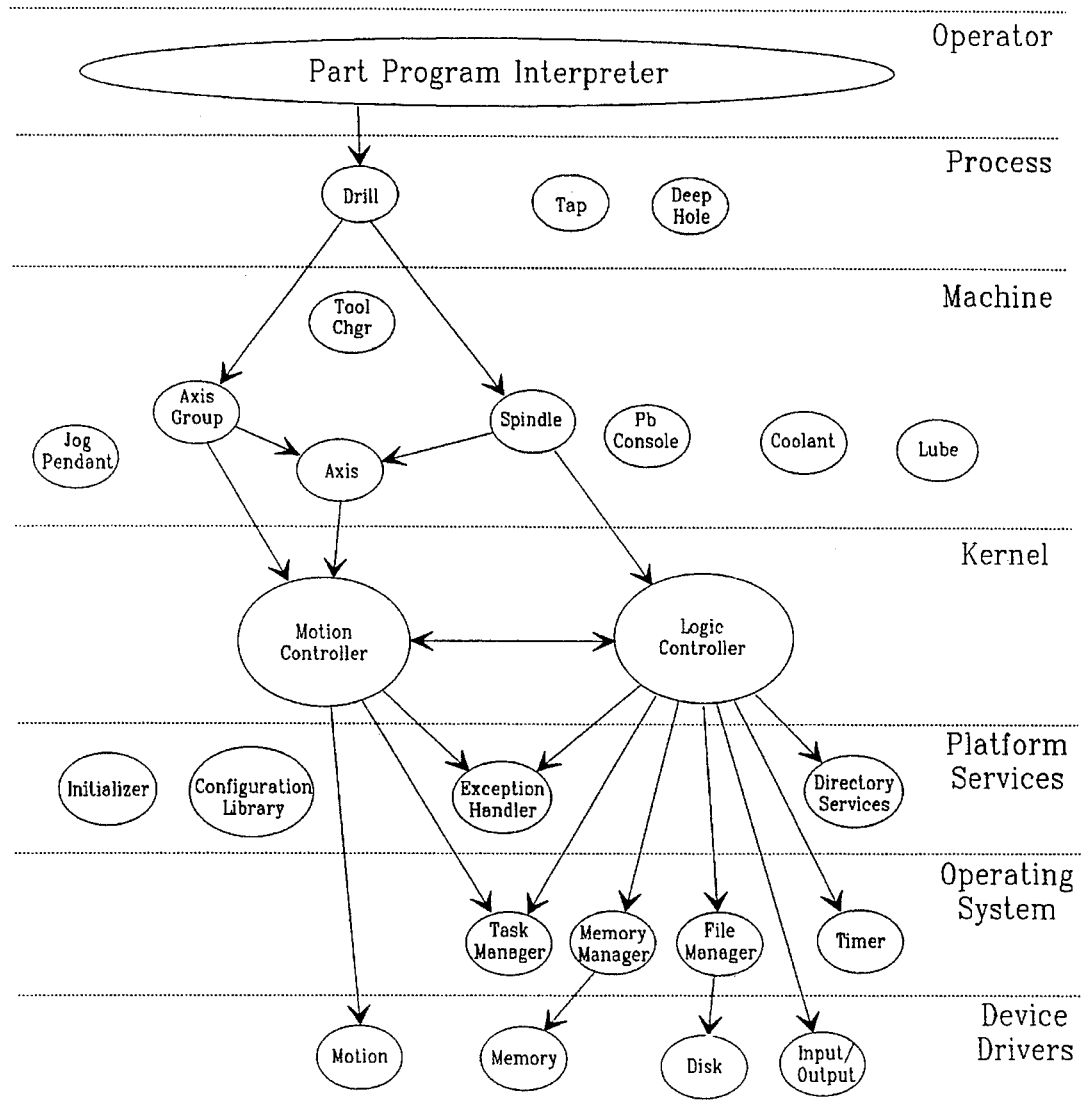
FIG. 2 is a schematic diagram of the types of software classes included in a CNC control system, and several representative types of object-oriented objects within several of these classes.

A diagram of the system of classes of software component classes is shown in FIG. 2.

The software objects use messages to communicate between the components. The class structure simplifies system operations and programming by limiting the messages of interest to each class. For example, the Machine class does not worry about the Kernel's responsibilities such as travel limits and servo errors. Conversely, the Kernel is not concerned about ownership or devices because the Machine class handles that exclusively. Messages sent from the Operator and Process classes to the system devices can originate from several sources, including the Part Program Interpreter, the User Interface, Push Buttons on the Console or Jog Pendant, or a Sensor Interface Applications can communicate with the Kernel through any or all of the system classes. For specific functions, a software engineer may bypass a class and connect an application directly to the next class or another class down. This is accomplished through the standard message formats supplied for each object component in the system.

The general format for messages sent between classes is set up as a data structure containing a common header and the arguments that are unique for each specific message. The header includes several variables that are common to all messages. The messages are designed to be variable length for efficiency. The message type is a static identification number which is unique to the class of message being sent (e.g., a calibration message). The transaction number, unique for each specific message transmission, is assigned at the time the message is sent and is used to match responses to the messages.

The response message is set up so that it uses the request message's ID and transaction field, and the status is set to "received" or "completed" or "denied" as required. This makes it clear which request is associated with the response. Responses have no arguments associated with them. Anything that requires arguments to be passed is considered to be a new message. For example, the response to an IOSend-Node message is an IOInfo message with the data field passed as an argument. A Sample message structure is as follows:

There are three types of messages: actions, information blocks (info), and cycles. Actions are system messages that are required to conduct basic communication between system components and do not change from one machine type to another. Info messages include a block of information that was either requested by a system component or that is sent relative to a button-event, key-press or mouse-click for example. Cycles are messages that perform customized operations that may change from one machine to another. Cycles may be supported by ladder logic sequences in the Logic Controller program. In addition to using new and existing Cycles, the system integrator may take advantage of the Softkey and Prompt messages in conjunction with ladder logic to form customized operations that allow interactive input from the operator console. For example, toolchanger calibration could be done by invoking a ladder logic sequence which responds to a specific softkey and then performs the logic necessary to do calibration for a particular machine. This would require no hard-coded software in the system and would be completely configurable by a system integrator without the control builder's assistance.

Any Part Program Interpreter (PPI) may be used as long as it uses the embodiment's interface.

Components of the Operator Class may include the following: Conversational part program interpreter, NC interpreter, Manual mode user interface, Auto mode user interface, Diagnostics user interface, Program editor for conversational programming and Program editor for NC programming The Process class contains pre-packaged objects using multiple class objects. When an application uses packaged cycles, the operator can specify a type of operation and define only the necessary variable information. Then the system makes additional calculations to define the operation fully. For example, when the operator is programming a shaping process such as a hole-making drilling operation with pecking, the operator simply specifies the peck type and depth (thereby defining the X, Y and Z dimensions) and the system uses a canned cycle to determine the exact movements of the drill during the pecking process. Another example would be a milling object which represents a milling operation to be used to shape a workpiece. The object may further include means for defining whether the shape to be milled is to be removed from the workpiece or left remaining in the workpiece. The object may also include sequencing status means representative of whether the process defined by the object has been performed. In one embodiment, packaged cycles are contained in libraries that can be used by different operator programs with little or no modification. These cycles are pre-programmed, common machining operations and include drill, tap, peck and ream.

The Machine class forms a device-oriented interface between the details of the Kernel and the operator programs and canned cycles. The Machine class manages the complexity of the system by handling the device responsibilities between the operator programs and the Kernel. The Machine class establishes and monitors the operator programs' connections to the Kernel and handles messages between the applications and Kernel. Each application has a copy of the Machine class included in order to interface in a common way to the Kernel. Shared data assures that all applications use the same Machine class state information.

Since the Machine class uses object-oriented design, it contains objects that define specific devices with possible functions for each device. For example, some possible functions of the spindle object may be run, clamp, and stop. The object's data describe the speed range and current speed. An operator program may not necessarily use all of a Machine class object's functions, but the functions are available and supported by the Kernel.

Typically, a copy of the Machine class will be attached to each operator application being used in order to provide a common interface to the Kernel. In addition, a customer may extend the functionality of the Machine class being used, as long as the same Machine class is being used by all operator programs. One embodiment of the Machine class contains the following objects: Push-button Console, Jog Pendant, Axis, Axis Group, Spindle, Tool Changer, Coolant and Lube.

The Kernel provides mechanisms for coordinating multiple, servoed axes and to provide discrete I/O control. The CNC applications communicate with the Kernel components, the Logic Controller and the Motion Controller, through the Machine class. These Kernel components decide how to implement the operator programs' commands for the hardware provided.

The Motion Controller provides multi-axis coordination as in most commercial CNCs. In its basic form, it controls five coordinated axes plus one spindle and two auxiliary axes. In addition it supports several types of interpolation algorithms including linear, circular, elliptical, helical, and polynomial. Applications communicate with the Motion Controller through the Machine class message interface.

The Logic Controller (LC) contains two programs: programmable ladder logic and the LC engine. The LC uses a window-based programming environment either off-line or at the Operator level to simplify production of a logic program to run on the LC. The LC also has software tools to change, debug, and monitor the operation of the ladder logic.

The Platform Services class of the present invention provides the structure that allows operator programs and third-party software to connect to the system and communicate with other software applications. There are four services that control system connection and communication:

Initialization Sequence—a file, similar to a PC's autoexec.bat file, listing all operator programs in the order that they will start during start up;

Directory Services—a registry of all active programs;

Machine Configuration Library—a shared memory area to store default machine parameters for application configuration. This is similar to the win.ini file in the Microsoft Windows system; and Exception Reporter—collects, organizes, stores and distributes all errors of interest to the active applications Directory Services contains a "phone book" that lists all running applications. Applications register with Directory Services and receive addresses of the other applications with which they need to communicate. Directory Services does not assume any specific communications connections. This means that the system is dynamically configurable to allow addition of other applications that use the interfaces of an embodiment of the present invention. Applications store the addresses they receive from Directory Services in their own directories. Applications, such as the Kernel, that need machine configuration parameters can retrieve those parameters from the shared memory where the Machine Configuration Library stores the information.

An operating system usable in connection with the present invention complies with IEEE-1003.1 POSIX (a standard for application programming interface for UNIX) and the IEEE-1003.4 POSIX standard that defines real-time extensions. This embodiment uses the Lynx operating system (LynxOS), a real-time, UNIX-like, operating system that runs on any 386 PC/AT or greater compatible computer. LynxOS has these characteristics: (1) Compliant with POSIX 1003.1, POSIX 1003.4 real-time extensions and POSIX 1003.4a threads interface; (2) Full UNIX compatibility (binary and source with System V, source with BSD 4.3); and (3) Completely deterministic, including Multi-tasking with user-defined priority levels, Multi-threaded support for real-time ADA, Offers demand-paged virtual memory, Runs off-the-shelf Interactive UNIX System V software without recompilation, and Networking and communication facilities including TCP/IP and NFS. The LynxOS development tools including over 170 UNIX-compatible utilities and the standard UNIX libraries may also be used. The tool set used in one embodiment supports DOS I/O facilities, Debugger software, Re-entrant device drivers, Compilers for C, FORTRAN, Pascal, BASIC, and ADA, GNU Package (GCC, Emacs, GDB, C++), X Window System, Motif, Network File Sharing (NFS) and Transmission Control Protocol/Internet Protocol (TCP/IP).

The Device Drivers class forms the interface between the operating system and the hardware devices such as I/O peripherals (e.g., serial communications ports), video displays, and mass storage devices. The operating system calls these drivers when a device is installed (at boot time or dynamically) and when application programs need to access a device. The device drivers in the embodiment are capable of handling multiple devices and respond rapidly to high-priority tasks. The present invention contains the following types of drivers: PC/AT keyboard and serial mouse, Analog input/output card, SCSI device driver, Floppy disk device driver, Ethernet interfaces, Internet message and transmission control protocol, Internet protocol and protocol family, Internet user datagram protocol, Pseudo terminal driver, Hard copy and video terminal interface, NFS client I/O and server drivers, CANbus, and MATRIX4

DETAILED DESCRIPTION

Overview—Hardware

FIG. 1 is a schematic diagram of a typical CNC machine on which the control system of the present invention may operate. A standard PC-compatible ISA bus 10 is connected to CPU processing unit 11 and its associated motherboard, preferably an Intel 80486 class microprocessor. The bus may also access RAM memory 12, which may alternatively be connected directly to the motherboard. ISA bus 10 may optionally provide an interface to network 13. Mass storage device 14, which may include both hard and floppy disk drives is also connected to ISA bus 10, as are standard communications ports 20, motion control board 18 (preferably a DSPCG, Inc. (Minneapolis, MN) Matrix 4 / Vector 4 combination mounted on a VME bus), and video interface 15.

In one embodiment, the CNC machine specific hardware of the system are interconnected via a CANbus bus system. Accordingly, CANbus interface card 16 is also positioned in ISA bus 10. CANbus cable 17 connects other CNC machine hardware components and provides communication therebetween, CNC machine operator console 19, jog pendant 21, and servo motors 25, 26. In general, motion control board 18, or CANbus interface 16 and CANbus cable 17, provide means for transmitting command signals to a movable tool, such as servo motors 22–26 and/or the axes or tool fixtures connected thereto. Servo motors 22–24 control movable tools for shaping a workpiece, such as X, Y and Z axes of the machine tool, respectively, while servo motor 25 may control the spindle which rotates a cutting tool. Servo motor 26 may control an tool changer which holds a plurality of workpiece shaping tools, such as milling bits or may control a rotary table.

The system uses industry standard cards including the new CANbus distributed I/O card. This bus allows a user to attach nodes to the system rather than insert cards into the cabinet. The high availability of the cards keep prices low and reliability high. Standard board sizes and mounting holes keep the system open to changes and upgrades. Keyboards, trackballs, and jog pendants are connected as CANbus nodes to the system. The keyboard may be located away from the main platform without decreasing the quality of the signal. However, to comply with safety standards, the emergency stop button and the power on/off switch are wired directly.

The control system of the present invention System offers two back plane buses: ISA and VME. Both meet LynxOS and POSIX standards and communicate with the control system software. Using CANbus and MATRIX4 with either bus permits real-time path correction based on auxiliary sensors such as vision, secondary axis, and temperature sensors.

The system's I/O backbone is the CANbus, a multimaster serial bus. CANbus can be structured to form many different architectures because it has different types of PC configurations and the CANcore module to standardize the interface to I/O peripherals. CANcore acts as a CANbus node allowing the customer to connect peripheral I/O through the industry standard SPI (Serial Peripheral Interface) Bus.

The system uses the MATRIX4 to decrease system integration costs, increase motor control system performance, and create component sourcing options for the customer. This controller is a fully digital, 4-axis position controller available on both the ISA and VME host platforms. The flexibility of the controller design allows a user to adapt the controller to any motor design on the market. The controller is capable of interfacing to DC brush, DC brushless, and AC induction motors and allows most parameters to be programmed dynamically. This allows immediate updates when there are changes in the environment or operating conditions.

Overview—Object Oriented Systems

An overview of the broad categories of the software components of the CNC machine control system of the invention is shown in FIG. 2. In the Operator class are software programs generally classified as the Part Program Interpreter (PPI) or user interface. This type of software is generally well-known in the art, and except for the way it communicates the information it obtains to the remaining software components, does form a part of the invention per se. The PPI may either interrogate the operator to input steps to machine a workpiece, or may prompt the user to specify a data file having a digitally stored part manufacturing description. Regardless, once information about the part is obtained, the PPI dynamically creates appropriate objects in the Process class as further described below.

The control system of the present invention uses object-oriented design and programming object-oriented design means that software components are created from data and functions and are organized into objects. Software components communicate through messages sent between objects. Objects have two parts: data and methods. Objects are abstract representations of the basic things a system handles (e.g., a spindle, tool changer, or type of motion). An object's attributes describe the object, but not how it works. The object's methods, are instructions, programs, procedures, or actions that describe what the object will do when something happens. So a spindle object's methods may be initialize, run, orient, speed override, and stop. The object's data describe the speed range and current speed.

Using object-oriented programming, objects can be quickly created using a class, the blueprint for the objects. The class establishes the basic variables that are common to all of its objects, and the new objects inherit these common characteristics from the parent class. This feature allows the software engineer to build on existing design and code by creating more specific objects from the easily reused code in the general class. For example, a software engineer can use a general class of characteristics for a "device" to create a model of a more specific device such as a spindle.

A method belongs to an object and indicates how to perform an action or how to react when an action is performed on the object. The system may only access data through the methods, if at all. Methods, therefore, hide an object's data and send messages to perform operations. This isolates dependency on a particular data structure thus permitting new features to be added without changing the arrangement of the original objects. This structure protects the data from the damage that commonly occurs during changes in monolithic, proprietary systems.

As with data characteristics, methods can also be inherited from the parent class when a new class or object is created. Of course, the new class or object may use the method or create a different version of it. Different objects can use identical methods. Therefore, a software engineer writes the code for the method only once and then reuses it after that. The reusability of existing object-oriented code makes development and modification faster because there is less to write and maintain. An additional benefit of using object-oriented methods is the localization of change. Data hiding isolates code from other code and reusing methods removes the need for switch statements and other references throughout the code to the system's condition or processing state. This limits the ripple effect of changes and makes it easier to maintain large, complex programs.

The control system of the present invention software contains class libraries, of machining software. These libraries contain machining procedures and functions that can be called with an expected result. These libraries are grouped into object-oriented classes that may be used as is and/or extended. The core libraries contain the most basic characteristics needed for primitive operations.

The software employs a bi-directional messaging interface to facilitate communication between components. Messages are passed between the CNC applications (PPI and Process Class) and Kernel. Communication from the applications to the Kernel differs from communication between the applications in that Kernel communication is more precisely defined for the Kernel. Each component communicates through messages. These messages may have different requirements. Messages are managed for efficient communication. Unordered, independent messages are executed immediately. Ordered, dependent messages are queued. A queue message is not executed until the previous message is complete, and each component maintains a separate message queue.

A key feature of the CNC control system of the present invention is the ease with which existing systems can be brought onto the new platform. The obvious advantage of this feature is that it preserves features of existing systems while providing a migration path to future technologies. There are two ways a user may take to move existing software to the control sytem of the present invention: (1) porting "C" systems for immediate use, or (2) conversion of procedural code to C or C++.

Machine Class

The Machine Class is an object-oriented interface to the Kernel and Process Class. This class contains the machine's device-specific application procedures to hide the complexity of the Kernel and the message interface from the CNC applications. This is accomplished through the interface between the Machine Class and the CNC applications (Process Class/PPI). Applications call standard functions to the Machine Class objects which sends a message to the Kernel. The Machine Class objects handle all communication between the Process Class objects and the Kernel including the creation of the communications port, use of appropriate communication functions, and passing messages back to the CNC applications. The specific Machine Class responsibilities are allocation of resources and connection to the Kernel, message handling between the Kernel and the CNC applications, and device state monitoring and management.

When the system starts up, the Machine Class allocates the resources that the application needs and creates a port to the Kernel from each CNC application. After the port is created, the Machine Class logs in to the port creating a two-way connection between the Kernel and each running application. This allows messages to be sent back and forth from the applications to the Kernel. Multiple copies of the Machine Class may be used in the system. In fact, it is customary to attach a copy of the Machine Class to each CNC application being used.

Kernel

The Kernel Class is the mechanism through which CNC applications control machinery. The Kernel provides mechanisms for controlling discrete I/O and coordinating motion axes. This general controller can be used in a variety of machining applications. The Kernel contains two components: Logic Controller and Motion Controller. The Motion Controller performs multi-axis coordination. In its basic form, it controls five coordinated axes plus one spindle and two auxiliary axes. In addition it supports several types of interpolation algorithms including linear, circular, elliptical, helical, and polynomial. Applications communicate with the Motion Controller through a message interface. The Logic Controller (LC) engine executes ladder logic/GRAFCET programs to control the machine at the lowest level. There are two programs the LC engine executes: the user program and the system program. The LC also has tools to change, debug, and monitor the operation of the ladder logic.

Operating System

The real-time, UNIX, execution environment provides all of the standard advantages of a real-time environment with its diagnostics and response capabilities. In addition, X Window is a standard, graphical, user interface. X Window permits a variety of input devices (e.g., mice, keyboards, graphic displays) to be simultaneously shared by several programs. This flexibility allows developers to leverage their areas of expertise without being concerned about the basic system graphics. This window-display interface also allows the user to run one machine and display its output on another, an definite advantage for a CNC application. Motif manages the windows created by X Window. This manager allows the user to control the size, location of windows on the screen, and identification of the active window. This software also provides a library of X Window items to use in system development. TCP/IP is a network protocol that runs on Ethernet. It allows X Window to perform network transparent activities such as remote procedure calls. Its file sharing capabilities means that programmers do not need to download files.

Platform Services

The Platform Services Class provides these functions:

Initialization Sequence—a file listing all applications in the order that they will start during power up;

Directory Services—a registry of all active applications

Machine Configuration Library—a shared memory area holding default machine parameters;

Exception Reporter—collects, organizes, stores and distributes all errors of interest to the active applications Applications register with Directory Services and receive addresses of the other applications with which they need to communicate. Applications store the addresses they receive from Directory Services in their own directories. Applications, such as the Kernel, that need machine configuration parameters can retrieve those parameters from the shared memory where the Machine Configuration Library stores the information.

Messages between the applications use POSIX message queues. These queues, are created at run time and have unique names. Each application receives messages through one instrument, but as when using telephones, each application can communicate with many different applications.

The Initialization Sequence is the init script file listing all applications in the order that they will start during power up. It is executed after the operating system boots. The Initialization Sequence's primary responsibilities are to:

Load various CNC system drivers (CANbus, MATRIX4, and the serial port driver)

Start Directory Services, the Exception Reporter, the Kernel, and the user display Create the Machine Configuration Library Start listed applications A user may create and change this script. It should begin with the device drivers, Platform Services, and the X Window System. Other applications in the script may be the CNC applications and the motion subsystem and Logic Controller within the Kernel. To create or change the script, the customer may use an editor (Vi) or the interactive setup program. The script can also be created automatically with the software installation program. The following is a representative initialization sequence script.

```

# Dynamically installed device drivers

dynaminst    /Devices/MATRIX4.insttab
dynaminst    /Devices/CANbus.insttab

# System Services

/bin/DirectoryServices
sleep 5
/bin/ExceptionReporter

# Kernel

/bin/Kernel &

# User Applications

/Apps/bin/Manual &
```

Platform Services Messages

Messages have a standard grammar using command verbs with possible qualifiers. There are three types of qualifiers:

Structure—defines a type of variables.

Enumeration—a list of integer values allowing association of constant values with qualifier names.

Union—a variable that may hold (at different times) objects of different types and sizes. It is used to manipulate different kinds of data in a single storage area without embedding any machine-dependent information in the program.

Required qualifters begin with a capital letter, and optional qualifiers use no capitals.

Message Structure

Messages used by the Platform Services have this basic structure:

Verb Qualifiers

A verb describes the message request. The verbs used by the Platform Services' components are—

Add —establishes a phone book listing for an application

Get—finds the address of an application or the configuration information in shared memory Update—supplies new information for an application Ping—checks on the status of an application (active or shutdown)

Request—asks to be informed when a condition has changed

The qualifters are data structure names followed by the data structure elements. These qualifters can be composed of other qualifiers (i.e., dynamic data structures). Verbs act on the qualifiers.

Platform Services Schema

The schema defines the data structure qualifiers for all messages and global data used by Platform Services. Platform Services' messages use the following qualifiers:

| . | String . | PhoneListing |
|---|---|---|
| . | Description . | Value |
| . | FieldPtr . | FieldCount |
| . | DataType . | ErrorCode |

The following qualifier descriptions contain definitions in the form of text and in "C" code and the definitions of the "C" code data names.

String

String is a structure describing a collection of ASCII characters. The "C" data structure follows:

```
typedef struct
{
        int     length;
        char    characters[];
} String;
``` length=number of characters in the string
characters=an array of letters, numbers, and/or symbols

Description

Description is a string explaining a variable concept (e.g., an error condition) in a message. The "C" data structure follows:

typedef String Description;

FieldPtr

FieldPtr is an index in to the Machine Configuration database. The "C" data structure follows:

typedef int FieldPtr;

FieldCount
If the field is an array the FieldCount indicates the number of elements in the array. The "C" data structure follows:

typedef int FieldCount;

PhoneListing

PhoneListing is a data structure representing the address of an application in a directory listing. The "C" data structure follows:

```
typedef struct
{
        string  processName;
        portName  Name;
        int       processID;
} PhoneListing;
``` processName=name identifying the application
portName=name of the connection port for the application identified
processID=integer code identifying the application

DataType

DataType is an enumeration of data representations. The "C" data structure follows:

```
typedef enum
{
        undefined;
        integer;
        floatingPoint
} DataType;
```

Undefined=data type not specified
Integer=data consisting of whole numbers
FloatingPoint=floating point data
String=data expressed with characters

Value

Value is a union representing a variable data type. DataType defines the data's size and type. The "C" data structure follows:

```
typedef union
{
        int     integer;
        double  floatingPoint;
        String  string;
} Value
``` integer=data consisting of whole numbers
floatingPoint=floating point data
string=data expressed with characters

ErrorCode

ErrorCode is an enumeration of exceptions. The "C" data structure follows:

```
typedef enum
{
        NoSeverity;
        Information;
        Warning;
        Fatal;
} ErrorCode;
```

NoSeverity=error of uncategorized severity
Information=error message providing information only (no action required)
Warning=error indicating application is having difficulty completing the task
Fatal=error indicating application is not able to complete current task

Directory Services

Directory Services functions as a registrar for the system applications. The responsibilities of Directory Services are to—

Maintain a list of applications in the system
Periodically check (ping) applications to see if they are still running
Provide queue addresses of registered applications Applications register in the Directory Services' phone book by listing their unique ASCII names. Then before an application can communicate with another application, it requests the POSIX message queue address from Directory Services' phone book. Each application has its own phone book. It lists only the addresses of other applications with which it needs to communicate.

Application Shutdown

Directory Services periodically pings all registered applications to be certain that they are still running. If an application has shut down, Directory Services removes the shut-down application from the list of registered applications, destroys its copy of that application's port connection, and informs all remaining, registered applications that the application has shut down. At that point, the applications decide if they need to disconnect from the shut-down application. Applications clean up after disconnecting by removing the reference for the shut-down application from their own directories.

Messages to Directory Services

Applications send messages to Directory Services to register in the phone book and to retrieve phone book entries of other applications. These messages use the standard message structure described previously.

Add

An application may send an Add message to Directory Services to establish a phone book listing for the application. The Add verb uses the PhoneListing qualifier with the required elements Name, PortName and ProcessID. The message structure is—

Add PhoneListing<Name> <PortName> <ProcessID>

Elements

The elements for the Add verb can use a string of ASCII characters.

<Name>ASCII character string<PortName>ASCII character string<ProcessID>number representing the process ID Sample Message:

Add PhoneListing LC LCport1194 151

Expected Responses

When Directory Services adds the new entry to its phone book, an "Added" response is sent to indicate that the phone listing was successfully updated. A "NotAdded" response is sent if Directory Services was not able to update its phone listing.

Added PhoneListing<Name> <PortName> <ProcessID>
NotAdded    PhoneListing<Name>    <PortName> <ProcessID>Description <errordescription>

Sample Response:

Added PhoneListing LC LCportl194 151

Get

An application may send a Get message to Directory Services to find the address of an application with which it wishes to communicate. The Get verb uses the PhoneListing qualifier. The message structure is—

Get PhoneListing<ProcessName>

Elements

The ProcessName qualifier is a string of ASCII characters.

<ProcessName>ASCII character string

Sample Message:

Get PhoneListing LC

Expected Responses

When Directory Services retrieves an entry from its phone book for a requesting application, it sends a "Got" response to indicate that the phone listing was successfully retrieved. A "NotGotten" response is sent if Directory Services was not able to find the phone listing.

Got PhoneListing<Name> <PortName> <ProcessID>

NotGotten PhoneListing<Name>

Sample Response:

Got PhoneListing LC LCportl194 46

Messages from Directory Services

Directory Services sends messages to applications under two conditions:

Checking to see that the application is still active (Ping)

Informing applications that another application is no longer active (Update) These messages use the standard message structure described previously.

Ping

The Ping verb uses the ProcessName qualifier. The message structure is—

Ping <ProcessName>

Elements <ProcessName>ASCII character string

Sample Message:

Ping LC

Update

Directory Services sends the application an Update message to inform an application of a change in another application's status. The Update verb uses the PhoneListing qualifier and has this structure—

Update PhoneListing<Status> <description>

Elements

<Status>enumeration of status conditions<description>ASCII string of characters describing the status condition Sample Message:

Update LC shutdown

Machine Configuration Library

The Machine Configuration Library provides default parameters for applications in a shared memory area. This service's responsibilities are to—

Load and distribute initialization parameters from the file system

Distribute parameters to applications

Some common parameters may be maximum acceleration, maximum RPM for the spindle, and travel limits and feed forward gains for each axis. Applications access these parameters under three circumstances:

During application start-up for initialization parameters

During run time when operational parameters are needed

When tuning or another operation makes it necessary for an application to refer to its configuration parameters This parameter library uses a C++ object, System Variables, to read and write data in the globally accessible shared memory area. The library also contains utilities to create, load the configuration, print, list, save, restore, and remove the information in the System Variables memory region.

System Variables Object

The System Variables object supports seven data types:

Bytes

Strings

Doubles

Integers

Short Integers

Long Integers

This object also includes methods for saving and reading the parameter information to and from disk. The System Variables methods are listed below:

BasePtr—returns the base pointer to the shared memory.

Close—closes a connection to the shared area.

Field—calls the SVField object (described in the following section) to find a field specified by the field name.

FieldCount—gets the number of elements for the field and returns the parameter count.

FieldSize—gets the size of the field and returns the parameter size.

FieldType—gets the data type and returns "B" for byte, "I" for integer, "D" for double, "S" for string, "H" for short integer, or "L" for long integer.

FileName—returns the configuration file name used to define the shared data area.

Some additional System Variable methods are listed below:

Get—finds configuration information in shared memory.

Update—places new configuration parameters in shared memory for an application.

GetField—traverses the list of fields in the shared area.

Name—returns the shared area name specified in the configuration file.

NumberOfFields—returns the number of fields defined for the System Variables.

PostSemaphore—releases the semaphore used to synchronize access to the shared area.

Remove—deletes the shared area completely from the system.

Restore—places a saved binary copy of the configuration parameters into the shared area.

Save—makes a binary copy of the configuration parameters and places it on the disk.

Size—returns the total size in bytes of the shared area (not the amount of shared area being used).

WaitSemaphore—gets the semaphore used to synchronize access to the shared area.

The PostSemaphore and WaitSemaphore methods allow a program to access the shared area and send several messages without the overhead of getting and releasing the semaphore for each Get and Update message. This approach saves time.

SVfield Object

The System Variables object uses the System Variables Field (SVfield) object to describe each field. Using this object improves efficiency of the field access function by providing detailed field information and eliminating the search for individual fields.

This object contains the following methods:

Name—supplies the name of the field (up to 31 characters including a null terminator).

Type—supplies the field data type ("B" for byte, "I" for integer, "D" for double, "S" for string, "H" for short integer, or "L" for long integer).

Count—supplies the number of elements that may be stored under the field name.

Elements are numbered beginning with zero.

Size—supplies the size of each field element. In 386/486 systems, integers and doubles are stored in four bytes while strings are variable length.

Utilities

There are several utilities available to create and manage the Machine Configuration shared data and the memory area:

SVcreate—builds a configuration file.

SVsize—checks the configuration file's size and recommends a minimum size.

SVprint—displays the field name, data type (B, I, H, L, D, S), the count (number of elements), and the size of each field.

SVloadConfig—places the default values into the shared memory area.

SVlistData—creates a file showing all of the data values currently stored in the shared memory area.

SVsave—makes a copy of the shared memory area under the file name specified in the configuration file.

SVrestore—dumps the shared area in hex bytes to be used for detailed debugging tasks.

SVremove—deletes the shared area from the system. The configuration file and any binary "save" files are left intact.

SVshmdump—displays the shared area in hex bytes. This can be used for low-level debugging.

Messages to Machine Configuration Library

Applications send messages to the Machine Configuration Library.

Get

An application may send a Get message to the Machine Configuration Library to access information. It uses this format:

Get Qualifier

Get FieldPtr

This message requests the<fieldPtr> or the Field Description. If the <fieldPtr> is zero, then this message requests the pointer to the description<name>. If the Description is empty, then this message requests the description of the field pointed to by<fieldPtr>. It is an error if the<fieldPtr> is zero and the Description to be empty.

Get FieldPtr<fieldPtr>Description<name>

Elements

The elements for the Get verb are—

<fieldPtr>Pointer to a field in the Configuration Library<Name>Name of the Field Sample Message:

Get FieldPtr 0 String "MaxTravelX"

Expected Responses

Configuration Library returns the following:

Got FieldPtr<fieldPtr>Description<name>

NotGotten FieldPtr<fieldPtr>Description<name> Description< errorDescription>

Sample Response:

Got FieldPtr 253 String "MaxTravelX"

Get Description

This message is used to request information about the Fields in the Machine Configuration Library. The Fields can be described either by using the name or a field pointer.

Get Description<name>Qualifier FieldPtr<fieldPtr>

Get Description<name>Qualifier Description<fieldName>

Elements

The elements for the Get verb are—

<name>name of the information requested from a field:
Field Count
Field Size
Field Type
Field valueQualifierThe Qualifier is a place holder for the results of the Get. It also specifies the data format (int, float, string) of the desired result.<FieldName>Name of the field< FieldPtr>Pointer to the field Sample Message:

Get Description "Field Count" int<count>FieldPtr 23

Get Description "Field value" FloatingPoint <value>Description "MaxTravelX"

Expected Responses

Configuration Library returns the following:

Got Description<name>Qualifier FieldPtr<fieldPtr>

Got Description<name>Qualifier Description<fieldName>

Sample Response:

Get Description "Field Count" int 10 FieldPtr 23

Get Description "Field value" FloatingPoint 23.5 Description "MaxTravelX"

Update

Update Description

This message is used to change information about the Fields in the Machine Configuration Library. The Fields can be described either by using the name or a field pointer.

Update Description<name>Qualifier FieldPtr<fieldPtr>

Update Description<name>Qualifier Description<fieldName>

Elements

The elements for the Get verb are—

<name>name of the information requested from a field:
Field valueQualifierThe Qualifier is new value for the field<FieldName>Name of the field<FieldPtr>Pointer to the field Sample Message:

Update Description "Field value" int 10 FieldPtr 23

Update Description "Field value" FloatingPoint 23.6 Description "MaxTravelX"

Expected Responses

The Configuration Library returns the following:

Updated Description<name>Qualifier Field Ptr<fieldPtr>

Updated Description<name>Qualifier Description<fieldName>

Sample Responses:

Updated Description "Field value" int 10 FieldPtr 23

Updated Description "Field value" FloatingPoint 23.6 Description "MaxTravelX"

Exception Reporter

The Exception Reporter receives all unsolicited error messages (e.g., servo faults) sent by the Kernel. The Exception Reporter responsibilities are to—

Receive error reports for applications and Kernel

Distribute error reports to applications

This makes error handling uniform across all applications. It collects and organizes the errors for applications that have registered with the Exception Reporter to receive particular types of messages. In addition, the Exception Reporter keeps a list of all current pending error messages. When an application starts up and checks in, it can receive all messages of interest to it.

Applications specify the severity and/or category of errors they want to receive. So an application may tell the Exception Reporter to notify it when any I/O errors are generated. Another application may want to be informed only of the fatal errors that shut down the machine.

Error Messages and Severities

The Exception Reporter filters errors for applications so that the applications only receive the messages they need. There are two basic types of messages in the Exception Reporter queue:

One-shot messages

Latched messages

When a one-shot message arrives, the Exception Reporter determines which applications need to receive the message, sends copies of the message to those applications, and then removes the message from its queue. When a latched message arrives, the Exception Reporter determines which applications need to receive the message and sends copies of the message to those applications. However, latched messages are not removed from the queue until another message arrives instructing the Reporter to remove the stored message. The latched messages that have not been cleared form the group of current pending messages that a newly started application may need to receive.

The messages may have three severities:

Information—describes a condition that may be of general interest to other applications.

Warning—indicates that operation of the machine has halted though the power is still on. The operator may need to take some action to continue operations.

Fatal—tells the system applications that the servo amp has been shut down and the power has been taken away from the machine control hardware. The operator must take some action to resume operations.

There are also categories of errors that may be of interest to applications:

Motion

Logic Control

Device Layer

Directory Service

Of course, the customer may also define additional error categories. Then when a message arrives, the Reporter matches its severity and category with the types of messages each application indicated it wanted to receive. For example, an application may need only the fatal, motion control messages, and another may need all logic control errors. After the messages are filtered in this manner, the one-shot messages are broadcast to all interested applications and removed from the queue. All latched messages are broadcast to interested applications and kept in the queue until specifically removed by another message.

Message Formats

Messages sent to the Exception Reporter either report an error or request error information. There are two verbs used in the Exception Reporter messages: Update and Request.

Update

To inform an application of an error condition, the Exception Reporter sends the application an Update message. The Update verb uses the Error qualifier and has this structure—

Update Error<ErrorCode> <description>

Elements

<ErrorCode>enumeration of exceptions<description>ASCII string of characters describing the error Sample Messages:

Update Error Fatal loss of encoder; X axis

Expected Responses

The Exception Reporter sends the error message to an application. If the error message was successfully sent, it returns an "Updated" message. If the error message was not sent successfully, it returns a "NotUpdated" message. The responses use these formats:

Updated Error<ErrorType>

NotUpdated Error <ErrorType> <ErrorValue> Desc <errordescription>

Request

An application may send a Request message to Exception Reporter to ask that it be informed of specified error conditions.

Request ErrorCode<Code>

Elements

<Code>enumeration of exceptions

Sample Message:

Request ErrorCode Fatal

Expected Responses

There are two expected response verbs: Requested and NotRequested. Both verbs use the ErrorCode qualifier.

Requested ErrorCode<Code>

NotRequested ErrorCode<Code>

Operator Class

Operator Class applications include part programming software. The conversational language used in a fully-featured package has a question/answer format using multiple choice and fill-in-the-blank questions, as well as clearly worded operator prompts. To further simplify part programming, the system displays graphic illustrations of plan view, side views, and/or an isometric view with dimensional scaling in the X, Y, and Z axes.

The conversational part programming package features the following:

Packaged Cycles

Part and Toolpath Graphics Verification for Conversational and NC programs

Programmable Safety Areas

"No-Calc" Programming

Estimated Run Time

99 Tool References

Automatic Speed and Feed Calculation

Inch/Metric Programming

Modal Parameter Blocks

Automatic Rough/Finish Pass

Data Block Search

After the operator completes a part program, there are several additional features of the software that can be used to improve efficiency and accuracy:

Error Checking

Test Run Function

Program Review

Program Text Printout

Graphics Printout

Upload/Download Utility

The automatic calculation feature allows the system to calculate certain unknown dimensions after sufficient information has been entered. This feature computes and displays Cartesian and polar data for a programmed move. For example, if the "X" and "Y" end coordinates are entered, the system automatically calculates the XY length and the XY angle parameters. The XY angle is the angle of the line segment (from start point to end point) measured counter-clockwise from the 3 o'clock position. If the XY length and the XY angle are entered, the system calculates the "X" and "Y" end coordinates.

Cutter Compensation

When beginning the part program, the operator describes all of the tools that will be used. Then the program can automatically allow for the diameter of the tool when determining the toolpath for an inward spiral or when connecting milling segments. With cutter compensation in use, the tool is offset from the print line a distance equal to the radius of the tool. The operator may also indicate whether to compensate on the right as in conventional milling or the left for climb milling. If the cutter compensation feature is not needed, the operator does not select it as an active option when programming a block.

Packaged Cycles

Packaged cycles are pre-programmed, common machining operations such as drilling, tapping, pecking, and boring and reaming. Since the system contains packaged cycles, the operator can specify a type of operation and define only the necessary variable information. Then the system makes additional calculations to define the operation fully. For example, when the operator is programming a drilling operation with pecking, the operator simply specifies the peck type and depth and the system uses a canned cycle to determine the exact movements of the drill during the pecking process.

RS-274-D Package

A RS-274-D package provides conventional NC (G-code) programming capabilities. This package allows the operator to save and load part programs to and from remote computers running CAD/CAM applications or other peripheral devices (e.g., paper tape readers). Communication between these devices is handled over RS-232-C serial ports. The NC editor in this package has the following features:

Character insert or overwrite modes

Optional sequence numbers

Automatic sequence numbering by a programmable increment

Block-to-block cursor moves (forward and backward)

Character-to-character and word-to-word cursor moves (forward and backward)

Jump to program beginning or end or scroll up and down on one page

Jump to block or sequence number

Jump to or replace a matching NC word

Automatic syntax checking of NC data blocks 10-element tag queue for "bookmarking" the program Jump to one of the tags NC block insert and delete Copy, move, or delete a range of NC blocks Interaction with the graphical system for program verification NC programs can be loaded into conversational PPIs through this interpreter.

PPI Messages

The Part Program Interpreter messages have the standard grammar using command verbs with possible qualifiers. There are three types of qualifiers:

Structure—defines a type of variables.

Enumeration—a list of integer values allowing association of constant values with qualifier names.

Union—a variable that may hold (at different times) objects of different types and sizes. It is used to manipulate different kinds of data in a single storage area without embedding any machine-dependent information in the program. Required qualifiers begin with a capital letter, and optional qualifiers use no capitals.

Message Structure

Any of the Part Program Interpreters used in the system have the same basic message structure:

Verb Qualifiers

A verb describes the message request. The verbs used by the PPI are—

Interpret—finds information about the axis positions and speed

Update—supplies new information about the axis position and speed

The qualifiers are data structure names followed by the data structure elements. These qualifiers can be composed of other qualifiers (i.e., dynamic data structures). Verbs act on the qualifiers.

PPI Schema

The schema defines the data structure qualifiers for all messages and global data used by any Part Program Interpreter (PPI). The messages use the following qualifiers:

String

Description

The following descriptions of these qualifiers contain definitions of the qualifiers in the form of text and in "C" code and the definitions of the "C" code data names.

String

String is a structure describing a collection of ASCII characters. The "C" data structure follows:

```
typedef struct
{
        int     length;
        char    characters[];
} String;
``` length—number of characters in the string characters—an array of letters, numbers, and/or symbols Description Description is a string explaining a variable concept (e.g., an error condition) in a message. The "C" data structure follows:

typedef String Description;

Interpreter Messages

Any Part Program Interpreter working in the system must use two standard messages: Interpret and Update.

Interpret

The Interpret messages send pieces of an RS-274 program to the Interpreter.

Interpret Description<programBlock>

The Interpret message directs the PPI to begin execution of the Part Program.

<programBlock>RS-274 program block

Expected Responses

If the PPI is able to interpret the program block, it responds with an Interpreted message. If the PPI is not able to interpret the message, it responds with a NotInterpreting message. The expected responses for any of the Interpret commands are—

Interpreted<Qualifier>

NotInterpreting<Qualifier>Description<errordescription>

Update

An RS-274 program is made up of many modals. The initial values of these modals can be set using the Update message.

Update Description<modalName>Qualifier

<modalName>Name of the Modal to be modifiedQualifiercontains data type and a value for the modal.

Expected Responses

The PPI responds with an Updated message to indicate that the modal has been set. If the modal is undefined, an NotUpdating error message is returned.

Updated<Qualifier>

NotUpdating<Qualifier>Description<errordescription>

Configuration Parameters

The Integration Tools, described later in this chapter, allow integrators to modify interactively the behavior of the controls as they adapt the controls to the machines. OEMs can modify the parameters for the following:

Kinematics

Servo Tuning

Safety Regions

Maximum Feeds and Speeds

Lead Screw Mapping

Remote Communications

Language

Version control of configuration files permits the integrator to extend previous versions of parameters and record the changes for backtracking purposes.

Machine Class

The Machine Class of the control system of the present invention forms a device-oriented interface between the Kernel and the CNC applications. The Machine Class establishes and monitors the CNC applications' connections to the Kernel and handles messages between the applications and Kernel. Each application includes a copy of the Machine Class to facilitate a common interface to the Kernel. Also, shared data assures that all applications use the same Machine Class state information.

Since the Machine Class uses object-oriented design, it contains objects that define specific devices with all of the possible functions for each device. For example, a spindle object may have the possible functions of run, clamp, and stop. The object's data describes the speed range and current speed of the spindle. A CNC application may not necessarily use all of a Machine Class object's functions, but the functions are available and supported by the Kernel.

A CNC application may also hook into packaged cycles from the Application Tool Kit. These cycles define common machining operations such as drill, bore, and tap and operate at a higher level in the control system than the Machine Class. By using these same Machine Class object methods, a customer may customize and expand the packaged cycles to meet specialized needs without concern for the details of Machine Class operations.

Multiple copies of the Machine Class may be used in the control system. It is recommended that a copy of the Machine Class be attached to each CNC application being used in order to provide a common interface to the Kernel. In addition, a customer may extend the functionality of the Machine Class being used, as long as copies of the same Machine Class are being used by all applications.

Described herein are two functional Machine Classes according to the present invention: (1) Milling Machine Class; and (2) Sample, generic Machine Class. The sample, generic Machine Class is a simple example designed to assist in gaining an gain understanding of the message interface. The Milling Machine Class is one that may be implemented for a basic milling machine.

Milling Machine Class

The Milling Machine Class allows customers with milling machines to become immediately operational. To use this Machine Class, customers simply link to the Machine Class library with their CNC application and gain access to the following objects:

Flow Control
Push-button Console
Jog Pendant
Axis
Axis Group
Spindle
Tool Changer
Coolant
Lube All of these objects allow a CNC application to grab ownership of the device, initialize the device, monitor its current state, and release ownership. When an application has grabbed ownership of a device, it then has the authority to issue action requests to that device using the methods provided. The Milling Machine Class can also be used in combination with the packaged cycles in the Application Tool Kit to customize the operation of a milling machine.

Sample, Generic Machine Class

A sample Machine Class may be used as a pattern to develop new Machine Classes. It contains the minimum object-oriented devices with their methods that are needed to operate a typical machine tool:

Flow Control—controls the communication from the CNC application to the Kernel's synchronous queue.

Push-button Console—reserves all necessary buttons and lights on the console for an application.

Axis—allows an application to control an individual axis or joint.

Axis Group—user-defined groups of coordinated axis moves (e.g., X, Y, Z, A, and B).

Spindle—basic functions of a machine tool spindle.

Tool Changer—basic functions of a tool changer.

Shared Memory

In an alternate embodiment of the invention, an area of the computer's memory is reserved for the Machine Class information. The shared memory contains ownership and state information for each device. Each copy of the Machine Class looks at this region to access information about the devices. However, access to this area is controlled so that applications can only view and change device information through the Machine Class.

Rules of Ownership

Since multiple applications may attempt to access the same device, the concept of device ownership is central to the operation of the Machine Class. Ownership of a device means that an application has reserved that device though the application may not be using device at the moment.

The application that "owns" a device has full access to it while other applications have read-only access. Applications are permitted to send messages to devices only if they have ownership of those devices. This minimizes the inter-component logic required for any application often used to determine permission conditions for a command. However, some decision logic is still needed within each application.

Systems with only a single application may be structured to never grab ownership of a device. In this situation, there would be a single owner of all devices.

Communications

Messages to the Machine Class devices can originate from several sources:

Part Program Interpreter

User Interface

Push Buttons on the Console or Jog Pendant

Sensor Interface

To simplify system operations and programming, the control system has a specific division of labor between its components. For example, the Machine Class does not worry about the Kernel's responsibilities such as travel limits and servo errors. Conversely, the Kernel is not concerned about ownership or devices because the Machine Class handles that exclusively.

This system structure also simplifies system communications and complies with the open systems concept. CNC applications may communicate with the Kernel through any or all of the system layers. For specific functions, the customer's software engineer may bypass a layer and connect an application directly to the next layer or another layer down. This, of course, is accomplished through the standard message formats supplied for each control system component.

Communication Connections

An application may communicate to the system components in two ways: (1) Through the system layers; or (2) Directly to the components. When an application uses the Machine Class layer, three advantages result:

1. Automatic message sequencing to the Kernel components (Logic and Motion Controllers)

2. Ownership handling for multiple processes

3. Simplified communication to devices

The control system permits communication through the Machine Class layer to the Kernel components. To operate efficiently, a CNC application's part program interpreter and its user interface (also called a man-machine interface-MMI) need the operational simplification provided by the packaged cycles from the Application Tool Kit and the features of the Machine Class.

However, some programs do not need the features of these middle layers. For example, the diagnostic and tuning programs within a CNC application are not concerned with the system's devices or ownership rules. These specialized programs can communicate efficiently by connecting directly to the Kernel functions. Another program that bypasses the middle layers is the Exception Reporter. It is not interested in the machine devices or even the Kernel functions and can connect directly to the messaging functions.

If a customer is using only one CNC application to control the entire system, that application must manage device access between different parts of the program.

Message Schema

The Machine Class messages use the qualifiers, listed in the schema below, to define the messages. Qualifiers are data structure names followed by the data structure elements. These qualifiers can be composed of other qualifiers (i.e., dynamic data structures). The message verbs, described in the following section, act on these qualifiers.

String

String is a structure describing a collection of ASCII characters. The "C" data structure follows:

```
typedef struct
{
    int     length;
    char    characters[];
} String;
``` length—number of characters in the string
characters—an array of letters, numbers, and/or symbols

DataType

DataType is an enumeration of data representations. The "C" data structure follows:

```
typedef enum
{
    Undefined;
    Integer;
    FloatingPoint;
    String;
} DataType;
```

Undefined—data type not specified
Integer—data consisting of whole numbers
FloatingPoint—double precision floating point number
String—data expressed with characters

Value

Value is a union representing a variable data type. DataType defines the data's size and type. The "C" data structure follows:

```
typedef union
{
    int     integer;
    double  floatingPoint;
    String  string;
} Value
``` integer—data consisting of whole numbers
floatingPoint—floating point data
string—data expressed with characters

AxisID

AxisID is an enumeration describing an individual axis. The "C" data structure follows:

```
typedef enum
{
    Xaxis;
    Yaxis;
    Zaxis;
} AxisID
```

Group

Group is a structure describing a group of axes. The "C" data structure follows:

```
typedef struct
{
    int     id;
    int     numberAxes;
    AxisID  axes[];
} Group
``` id—Axes group id
numberAxes—number of axes in group. Range 1—NumberAxis$_{max}$
axes—array of AxisID's

State

State is an enumeration of the current conditions of a device. The "C" data structure follows:

```
typedef enum
{
    Uninitialized;
    Calibrated;
    Stopped;
    at OrientPosition;
} State
```

Uninitialized—object has not been initialized.
Calibrated—object has been calibrated.
Stopped—object is not moving
OrientPosition—object has arrived at the orient position

ParameterInfo

ParameterInfo is a structure describing information specific to a device example of a "C" data structure for a tool changer follows:

```
typedef struct
{
    int toolID;
    int CarouselPosition;
} ParameterInfo
``` tooliD—integer representing the tool identification number. Range: 1—NumberTools$_{max}$

VelocityType

VelocityType is an enumeration of velocity representations. The "C" data structure follows:

```
typedef enum
{
    Undefined;
    XYZ;
    XYZAB;
    Spindle;
} VelocityType
```

XYZ—velocity for 3 axis machine

XYZAB—velocity for 5 axis machine

Spindle—velocity of the spindle

Velocity

Velocity is a structure describing speed and direction. The "C" data structure follows:

```
typedef struct
{
        VelocityType type;
        Value data;
} Velocity
``` type—indicates the type of velocity data in the structure data—velocity data; Units of (m/see) for linear axis and (radian/see) for rotary axis.

Override

Override represents a speed multiplier. The "C" data structure follows:

typedef double Override;

Override—representation of speed multiplier. Value of one (1) indicates 100%.
Range: 0.1–2.0.

Increment

Increment represents a delta position. The "C" data structure follows:

typedef double Increment;

Increment—representation of a delta move. Units for increments are meters.

Offset

Offset is a structure describing Delta position. The "C" data structure follows:

```
typedef struct
{
        int count;
        double delta[ ];
} Offset
``` count—number of axes deltas described in structure. (range 0-maxAxes)

delta—array of axis deltas. Meters are used for linear axis, and radian is used for rotary axis.

Feedrate

Feedrate represents coordinated linear speed of the Cartesian axes. Feedrate uses units of (meters/second). The "C" data structure follows:

typedef double Feedrate;

Linear

Linear is a Qualifier used with "Move" verb to describe a linear move. The "C" data structure follows:

```
tyedef struct
{
        Position endPosition;
        Attributes attributes[ ];
} Linear
``` endPosition—represents the linear position at the end of the move attributes—attributes describe condition that affect the move. "Until Limit Switch" is an example of an attribute.

Tool

Tool is a Qualifier used to describe a tool. The "C" data structure follows:

```
typedef struct
{
        int toolID;
} Tool
``` toolID—Integer representing the tool identification number. Range: 1—NumberTools$_{max}$

Gear

Gear is a Qualifier used to describe gear ratio. The "C" data structure follows:

```
typedef struct
{
        int gearID;
        double gearRatio
} Gear
``` gearID—integer representing the gear identification number gearRatio—floating point number representing the gear ratio

Machine Class Message Formats

The Machine Class messages begin with verbs to describe the message requests. These verbs reflect the actions of the methods listed for the device objects described in the next section. In the list below, each verb is defined and possible message formats are shown after the definitions. Many Machine Class verbs stand alone to direct the actions of objects. For those verbs, no message formats are not listed.

Grab

Requests ownership of a specific device.

UnGrab

Releases ownership of a specific device.

Initialize

Establishes default parameters necessary to operate a device.

UnInitialize

Forces a re-initialization of a specific device (must initialize after this verb is used).

Get

Retrieves the current information from a specific device.
Get Description<name>Qualifier
Get<ParameterInfo>

Update

Establishes a specific operational parameter for a device.
Update Description<name>Qualifier
Update<Override>
Update<Gear>
Update<Feedrate> <value>

Enable

Enables special operation of a specific device.
Enable<Power>

Disable

Disables special operation of a specific device.
Disable<Power>

Clamp

Engages the clamp on an axis or spindle.

UnClamp

Disengages the clamp on an axis or spindle.

Calibrate

Establishes a reference point for a specific device.

Run

Begins continuous operation of a specific device.

Cycle

Marks the starting position of a sequential operation of a specific device.
Cycle Description<cycleID>

Move

Engages coordinated operation of a specific device
Move Linear
Move Velocity
Move<Increment>

Dwell

Begins null operation of a specific device for a specified time.
Dwell FloatingPoint<time>

Stop

Ceases operation of a specific device in a manner that makes recovery possible.

Cancel

Ceases operation of a specific device immediately (recovery will not be possible).

Step

Engages the predefined operation of a specific device in a forward direction.

UnStep

Engages the predefined operation of a specific device in a reverse direction.

Machine Class Objects

The Machine Class's objects are representations within the system of the devices on a machine and the functions necessary to manage those devices (e.g., flow control, tool changer, axis, and spindle). All Machine Class objects have two parts: data and methods.

The object's methods, are instructions, functions, procedures, or actions that describe what the object does in response to an event. A method belongs to an object and indicates how to perform an action or how to react to an external event. An application may only access an object's data through its methods, if at all. Methods send messages to perform operations. The Machine Class objects with their methods are described in the following sections.

Flow Control Object

In an alternate embodiment of the invention, the control system's Milling Machine Class's Flow Control object controls the communication between a CNC application and the Kernel's synchronous queue. This object allows a CNC application to set up a communications port to the Kernel and monitor the current state of the Kernel for the application. An application must get ownership of the Flow Control object to gain control of the Kernel's synchronous queue. The following methods are included in this object:

Grab—requests ownership of the Kernel's synchronous queue.

UnGrab—releases ownership of the Kernel's synchronous queue.

Initialize—establishes default parameters necessary to operate the Kernel's synchronous queue.

Get<State>—gets the current active state of the Kernel's synchronous queue.

Enable<Power>—enables power for the Kernel's synchronous queue.

Disable<Power>—disables power for the Kernel's synchronous queue.

Run—directs the Kernel to process synchronous requests continuously.

Stop—directs the Kernel to stop processing requests from the synchronous queue.

Cancel—directs the Kernel to stop all activity immediately and flush the queue.

Step—directs the Kernel to process a single request in the synchronous queue.

Push-button Console Object

The Milling Machine Class's Push-button Console object allows an application to initialize and reserve all necessary buttons and lights on the console. In this way, the operator can press buttons to control power, start a cycle, hold the motion of the machine, and interrupt an operation while an application monitors these actions. When an operator presses a button, a message is sent to the application controlling that button. If the buttons are not enabled by an application, they are ignored by the Logic Controller.

The following methods are included in this object:

Initialize—establishes default parameters necessary to operate the push-button console.

Grab—requests ownership of the push-button console.

UnGrab—releases ownership of the push-button console.

Get—requests specified information from system components.

Enable—enables remote operation on the push-button console.

Disable—disables remote operation of the push-button console.

Update—establishes a specific operational parameter for the push-button console.

Jog Pendant Object

The Milling Machine Class's Jog Pendant object allows an application to initialize and reserve all necessary buttons and lights on the jog pendant. When an operator presses a button, the Kernel can generate a Move message immediately after receiving an Enable message from an application. If the buttons are not enabled by an application, they are ignored by the Kernel.

The following methods are included in this object:

Initialize—establishes default parameters necessary to operate the jog pendant.

Grab—requests ownership of the jog pendant.

UnGrab—releases ownership of the jog pendant.

Get—requests specified information from system components.

Enable—enables remote operation on the jog pendant.

Disable—disables remote operation of the jog pendant.

Axis Object

The Milling Machine Class's Axis object allows an application to control an individual axis or joint. The following methods are included in this object:

Initialize—establishes default parameters necessary to operate an axis.

Grab—requests ownership of an axis.

UnGrab—releases ownership of an axis.

Get<State>—gets the current active state of an axis.

Get<ParameterInfo>—returns current parameters.

Clamp—engages the clamp on an axis.

UnClamp—releases the clamp on an axis.

Calibrate—establishes a reference point for an axis.

Move<Velocity>—moves the axis at a specified velocity.

Move<Increment>—moves the axis a specified distance.

Stop—halts axis motion.

Axis Group Object

The Machine Class's Axis Group object describes a user-defined group of axes. The axis group handles multiple axis motion for coordinated moves such as linear and circular and time-coordinated joint moves (point-to-point). The object defines the axes' kinematics, handles ownership, and includes these methods:

Initialize—establishes default parameters necessary to operate the axis group.

Grab—requests ownership of the axis group.

UnGrab—releases ownership of the axis group.

Get<State>—gets the current active state of the axis group.

Get<ParameterInfo>—returns current parameters.

Move<Linear>—engages coordinated operation of the axis group as defined by the point vector, feedrate, attribute, and termination type.

Move <Joint>—engages coordinated operation of the axis group using point-to-point time coordination.

Dwell—pauses in motion defined by time in tenths of seconds.

Update<Group>—(axes) identifies which axes belong to this group.

Update<Override>—indicates the feedrate override factor.

Update<Feedrate>—(value) indicates the speed applied to a given Axis Group.

Update<Offsets>—indicates the offset used for Part Zero and other general offsets.

The Axis Group object has these additional methods:

Enable<Power>—enables power to the axis group

Disable<Power>—disables power to the axis group.

Stop—stops the specified axes.

Spindle Object

The Spindle object describes all possible functions of a machine tool spindle. This object grabs ownership of the spindle axis and sends messages to the Logic Controller to initialize, enable, and handle the spindle's orientation angle, the maximum RPMs, and all other necessary operations. This Machine Class object contains the following methods:

Initialize—establishes default parameters necessary to operate the spindle.

UnInitialize—forces a re-initialization of the spindle.

Grab—requests ownership of the spindle.

UnGrab—releases ownership of the spindle.

Get<State>—gets the current active state of the spindle.

Get<ParameterInfo>—gets current information parameters for the spindle.

Run—begins continuous operation of the spindle in the specified direction and at the RPM of the move.

Update<Override>—overrides the speed by a specified factor.

Update<Gear>—initiates a remote change of the spindle's gear speeds.

Clamp—holds the tool in the spindle.

Unclamp—releases a tool from the spindle.

The Spindle object has these additional methods:

Enable—enables remote operation of the spindle's manual push-button.

Disable—disables remote operation of the spindle's manual push-button.

Stop—stops motion of the spindle.

Tool Changer Object

The highly detailed Tool Changer object describes all possible functions of a tool changer. This object has access to the data indicating the number of tools in the changer, the current tool in the spindle, and the carousel position. The tool changer grabs ownership of the required resources such as the spindle and axes. The tool changer uses the storage slot number rather than the tool number for positioning. The tool number and related data are included in the Tool database. This object contains the following methods:

Initialize—establishes default parameters necessary to operate the tool changer.

UnInitialize—forces a re-initialization of the tool changer.

Grab—requests ownership of the tool changer.

UnGrab—releases ownership of the tool changer.

Get<State>—gets the current active state of the tool changer.

Get<ParameterInfo>—gets current information parameters for the tool changer.

Update<Tool>—sets the storage slot number for a tool in the spindle.

Enable—enables remote operation on the tool changer.

Disable—disables remote operation of the tool changer.

Calibrate—sets the indexer position.

This tool changer object also contains these methods:

Cycle—marks the starting position of a sequential operation of the tool changer.

Stop—halts tool changer motion.

Step—moves the tool changer one logical step at a time.

Coolant Object

The Coolant object describes all possible functions of the coolant mechanism. This coolant object contains the following methods:

Grab—requests ownership of the coolant device.

UnGrab—releases ownership of the coolant device.

Get<State>—gets the current active state of the coolant device.

Stop—indicates when to stop the coolant.

Run—begins continuous application of coolant and identify the type of coolant (mist, flood, or both).

Enable—enables automatic clearance plane detection and automatic shut-off.

Disable—disables automatic clearance plane detection and automatic shut-off.

Lube Object

The Lube object describes all possible functions of the lubrication mechanism. This lube object contains the following methods:

Grab—requests ownership of the lubrication device.

UnGrab—releases ownership of the lubrication device.

Get<State>—gets the current active state of lubrication device.

Stop—indicates when to stop the lubrication.

Run—begins continuous application of lubrication.

Kernel-Machine Class Communication Example

The following communication example demonstrates data moving through the Machine Class to the Kernel components. In this example, the CNC application is operating a spindle using the following steps:

1. Application grabs ownership of the Spindle. It receives an "OK" or a "Reserved" response.
2. Application requests SpindleRun.
3. Machine Class sends these requests to the Motion Controller:
   Update <Gear> (directs Logic Controller to activate sequence)
   Wait until LCflag (directs MC to wait for the LC flag)
   Move Velocity <rpm> (directs MC to apply voltage to the spindle axis)
   Update <Flag> SpindleAtSpeed (directs LC to report when up to speed)
   Wait until LCflag (directs MC to wait for LC flag before continuing)
4. The Motion Controller returns "OK" or "Conflict" responses.
5. The Motion Controller sends a SpindleGear request to Logic Controller and waits for LCTIag.
6. LC executes spindle enable and gear change logic:
   spindleOrient=Off
   spindleEnable=On
   spindleOn=On
   select gear speed based on RPM
7. LC sends request to MC to creep spindle axis.
8. MC sends "atCreep" message to LC.
9. C selects gear. If an error occurs an error message is sent to the Exception reporter and the Machine Class flushes the queue.
10. LC sets LCflag to satisfy first MC Wait (indicates that it is OK to start axis).
11. MC begins spinning the Spindle axis based on Move parameters. If an error occurs, send an error message to Exception Reporter, and the Machine Class flushes queue.
12. MC gives SpindleAtSpeed request to LC.
13. LC waits for SpindleAtSpeed input or time-out. If an error occurs, send error message to Exception Reporter, and the Machine Class flushes queue.
14. LC sets LCflag to satisfy second MC Wait (indicates sequence is complete).
15. LC sends Completion response to Application (if requested by Application).
16. Machine Class sets DalState=SpindleRunning (if requested by Application).

Customizing a Machine Class

The open systems design of the control system of the present invention permits modification of the Machine Class to handle machines that have not been used by the control manufacturer. This is possible because the devices are independently defined from the relationships between the devices. The Kernel's Logic Controller and the applications handle the actual device interdependencies during operation.

A system user may add features to a device definition and/or modify the characteristics of the device without being forced to change other devices. This allows the customer to develop an implementation of the system customized for a specific machine.

The Machine Class's object-oriented design allows software engineers customizing the Machine Class to quickly create new Machine Class objects by inheriting from existing Machine Class objects and then modifying them. Because of the advanced programming features of C++, a software engineer need not alter the source code of the control system for the objects in order to modify them. The new objects then inherit the common data characteristics from the parent objects. This feature allows software engineers to build on existing design and code by creating more specific objects from the easily reused code in the existing Machine Class objects.

As with data characteristics, methods can also be inherited from the parent object when a new object is created. Of course, the new object may use the method or create a different version of it. Methods send messages to perform operations. This isolates dependency on a particular data structure thus permitting new features to be added without changing the arrangement of the original objects.

Kernel

The Kernel of the control system provides mechanisms for coordinating motion axes with discrete input/output (I/O) control. This general controller can be used in a variety of machining applications. The CNC applications communicate with the Kernel components, the Logic Controller (LC) and the Motion Controller (MC), through the Machine Class.

Since the control system's software uses object-oriented design and programming techniques, the software components are created from data and functions organized into objects. The Logic Controller and Motion Controller components communicate with each other and with the CNC applications through special objects called messages. These messages use a common message structure, and both have a common message interface. Each component has an asynchronous queue and a synchronous queue. These queues function in the same manner in both controllers.

Messages may be synchronous or asynchronous depending on the requirements of the application. The synchronous messages are ordered and, therefore, dependent on the execution of previous messages in the queue. The asynchronous messages are independent of previous messages so that they can be executed immediately.

Kernel Message

The system messages provide two-way communication between the applications and the Kernel components. These messages have the following capabilities:
  Single commands
  Initialization parameters and configuration sent through the messages
  Synchronous messages are queued
  Asynchronous messages are executed immediately
There are different categories of messages:
  Flow control
  Parameters
  Diagnostics
  Requests
  Data
  Error

Message Structure

The messages of the control system of the present invention have a standard grammar using command verbs with possible qualifiers and variable attributes. There are three types of qualifiers:
  Structure—defines a type of variables.
  Enumeration—a list of integer values allowing association of constant values with qualifier names.
  Union—a variable that may hold (at different times) objects of different types and sizes. It is used to manipulate different kinds of data in a single storage area without embedding any machine-dependent information in the program.

In the list of messages presented below, required data elements begin with a capital letter, and optional elements use no capitals. Messages used by the Kernel have this basic structure:
  Verb Qualifiers
  A verb describes the message request. Qualifiers are data structure names followed by the data structure elements. These qualifiers can be composed of other qualifiers (i.e., dynamic data structures). Verbs act on the qualifiers.
  The verbs used by the Kernel components are—
  Run—is used to control the execution of the synchronous buffer (MC and LC).
  StopRun—is used to control the execution of the synchronous buffer (MC and LC).
  Move—directs the Motion Controller to move along a linear path or move at fixed velocity.
  Wait—tells the MC or the LC to not execute any messages after the Wait message until a StopWaiting message is sent.
  StopWait—tells the MC or the LC to begin executing messages again.
  Get—tells the MC or LC to send information to an application.
  Update—tells the MC or LC that an application wants to change the value of a parameter.
  Flush—tells the Motion Controller to delete all of the messages in its synchronous queue.

Kernel Qualifiers

The Kernel's schema describing the message qualifiers is shown on this and following pages. The qualifiers define the data structures for all messages and global data used by Kernel.

String

String is a structure describing a collection of ASCII characters. The "C" data structure follows:

```
typedef struct
{
    int    length;
    char   characters[];
} String;
``` length—is the number of characters in the string.
characters—is an array of letters, numbers, and/or symbols.

Name

Name is a structure that identifies the subject of the message with a descriptive term. The "C" data structure follows:

typedef String Name

Description

Description is a structure used to define the basic characteristics of the subject of the message. The "C" data structure follows:

typedef String Description

Value

Value is a union representing a variable data type. DataType defines the data's size and type. The "C" data structure follows:

```
typedef union
{
        int     integer;
        double  floatingPoint;
        String  string;
} Value
``` integer—is the data consisting of whole numbers.
floatingPoint—floating point data.
string—is the data expressed with characters.

PositionType

PositionType is an enumeration of Position representations. The "C" data structure follows:

```
typedef enum
{
        Undefined;
        XYZ;
        XYZAB;
        ZS;
        Spindle;
} PositionType
```

XYZ—position for 3 axis machine.
XYZAB—position for 5 axis machine.
ZS—position of the Z axis and spindle.
Spindle—position of the spindle.

XYZ

XYZ is a structure describing a position for the X and Y and Z axes. The "C" data structure follows:

```
typedef struct
{
        double x;
        double y;
        double z;
} XYZ;
``` x—position for the X axis. Range: $X_{min}$–$X_{max}$ (units: meters)
y—position for the Y axis. Range: $Y_{min}$–$Y_{max}$ (units: meters)
z—position for the Z axis. Range: $Z_{min}$–$Z_{max}$ (units: meters)

XYZAB

XYZAB is a structure describing a position for the X and Y and Z and A and B axes. Linear position is expressed in meters. Rotary position is expressed in radians. The "C" data structure follows:

```
typedef struct
{
        double x;
        double y;
        double a;
        double b;
} XYZAB;
``` x—position for the X axis. Range: $X_{min}$–$X_{max}$ (units: meters)
y—position for the Y axis. Range: $Y_{min}$–$Y_{max}$ (units: meters)
z—position for the Z axis. Range: $Z_{min}$–$Z_{max}$ (units: meters)
a—position for the A axis. Range: $A_{min}$–$A_{max}$ (units: radians)
b—position for the B axis. Range: $B_{min}$–$B_{max}$ (units: radians)

ZS

ZS is a structure describing a position for the Z axis and the Spindle. Linear position is expressed in meters. Rotary position is expressed in radians. The "C" data structure follows:

```
typedef struct
{
        double z;
        double spindle;
} ZS;
``` z—position for the Z axis. Range: $Z_{min}$–$Z_{max}$ (units: meters)
spindle—position for the spindle. (units: radians)

Position

Position is a structure describing a position. The "C" data structure follows:

```
typedef struct
{
        PositionType type;
        Value data;
} Position
``` type—indicates the type of position data in the structure.
data—position data; meters are used for a linear axis and for a rotary axis.

Contact

Contact is an enumeration types of physical contact for attributes. For example, a probe attribute is a move until a probe makes contact or break contact. The "C" data structure follows:

```
typedef enum
{
        Undefined;
        Make;
        Break;
} Contact
```

Make—contact is made.
Break—contact is broken.

EnableDisable

EnableDisable is an enumeration describing if a attribute is enabled For example, the Feed rate override is enabled or disabled. The "C" data structure follows:

```
typedef enum
{
        Undefined;
        Enable;
        Disable;
} EnableDisable
```

Enable—turn on attribute.
Disable—turn off attribute.

TerminationType

TerminationType is an enumeration describing the ending condition of a move. The "C" data structure follows:

```
typedef enum
{
        Undefined;
        PrecisionEndPoint;
        NoDeceleration;
} DecelerationType
```

PrecisionEndpoint—end point of line must be reached with in in-position tolerance.
NoDeceleration—Move is part of continuous contour. End point is not important.

AttributeType

AttributeType is an enumeration of attributes. The "C" data structure follows:

```
typedef enum
{
        undefined
        Limit Switch
        Probe
        Overrides
        MotionHold
        Absolute
        Incremental
        Deceleration
        Concurrent;
} AttributeType
```

LimitSwitch—indicates that the move is terminated on either make or break of limit switch.
Probe—indicates that the move is terminated on either make or break of probe.
Override—enables or disables override for move.
MotionHold—enables or disables override for move.
Absolute—position is described in absolute coordinates.
Incremental—position is described in incremental coordinates.
Deceleration—deceleration attribute.
Concurrent—this move can be concurrently executed with another move.

Linear

Linear is a qualifier used with the Move verb to describe a linear move. The "C" data structure follows:

```
typedef struct
{
        Position position;
        Attributes attributes;
} Position
``` position—indicates the endpoint of the linear move.
data—attribute modifying the motion description.

VelocityType

VelocityType is an enumeration of velocity representations. The "C" data structure follows:

```
typedef enum
{
        Undefined;
        XYZ;
        XYZAB;
        Spindle;
} VelocityType
```

XYZ—elocity for 3 axis machine.
XYZAB—velocity for 5 axis machine.
Spindle—velocity of the spindle.

Velocity

Velocity is a structure describing a position. The "C" data structure follows:

```
typedef struct
{
        VelocityType type;
        Value data;
} Position
``` type—indicates the type of velocity data in the structure.
data—velocity data; Units of (m/sec) for linear axis and (radian/sec) for rotary axis.

VelocityMove

VelocityMove is a qualifier used with the Move verb to describe a constant velocity move. The "C" data structure follows:

```
typedef struct
{
    Velocity velocity;
    Attributes attributes;
} VelocityMove
``` velocity—indicates the rate and the reference frame of the move.

attributes—attribute modifying the motion description.

RunAttribute

RunAttribute is an enumeration of Run message attributes. The "C" data structure follows:

```
typedef enum
{
    Undefined;
    SingleCycle;
    Immediate;
    EndOfCycle;
    MotionHold;
} RunAttribute
```

SingleCycle—requests that the motion control stop after the end of each cycle.

Immediate—requests that the motion command be executed immediately.

EndofCycle—marker for separating moves in a cycle.

MotionHold—indicates a motion hold condition.

ErrorCode

ErrorCode is an enumeration of types of error codes. The "C" data structure follows:

```
typedef enum
{
    NoSeverity;
    Information;
    Warning;
    Fatal;
} ErrorCode
```

NoSeverity—error of uncategorized severity.

Information—error message providing information only (no action required).

Warning—error indicating application is having difficulty completing the task.

Fatal—error indicating application is not able to complete current task.

Motion Controller

The Kernel's Motion Controller performs multi-axis interpolation generating target points for the servo hardware. The Motion Controller supports high speed spindles (up to 60,000 RPM), rigid tapping, encoder jog, and touch probing. An exemplary motion controller has these features:

Five (5) coordinated axes plus one (1) spindle

Programmable interpolation rate—5 milliseconds to 20 milliseconds

Provides status information for—
  position (command and actual)
  velocity
  following error Leadscrew and backlash compensation using linearly interpolated tables Leadscrew compensation corrects for mechanical error up to 200 times per second 5 millisecond block transfer rate resulting in more detailed information being processed faster Non-linear control for circle compensation Acceleration control regulates velocity, allowing tighter coordination between more than one axis while minimizing mechanical wear on the machine Coordinated interpolation with the spindle Programmable calibration and referencing sequence Enhanced Servo Algorithm interfaces with the motion controller board to monitor machine position 10,000 times per second

Configuration Parameters of the Motion Controller

The Motion Controller configuration parameters define the travel limits, PID gain parameters, kinematics, and additional miscellaneous parameters.

Travel Limits

This parameter establishes the valid travel limits. They can be negative to positive or positive to negative along the X, Y, and Z axes.

PID Gain Parameters

The gain parameters are used for closed loop control of each axis (x to b). These parameters are—
  proportional (P)
  integral (I)
  derivative (D)
  integral limit
  velocity feed forward The parameter values are downloaded to the appropriate hardware for controlling the axis. Then, the modified PID algorithm with velocity feedforward residing on the hardware controls each axis.

The Application Tool Kit may be utilized to set and adjust the parameters.

Programmable Kinematics

The user may specify the relationships between axes to support a variety of axis configurations. The forward kinematics determine the position and the orientation of the end-effector given the joint angles. The inverse kinematics determine the joint angle given the position and orientation of the end-effector. The possible kinematics parameters are—

X position=$X_0J_0+X_1J_1+X_2J_2+X_3J_3+X_4J_4$

Y position=$Y_0J_0+Y_1J_1+Y_2J_2+Y_3J_3+Y_4J_4$

Z position=$Z_0J_0+Z_1J_1+Z_2J_2+Z_3J_3+Z_4J_4$

A position=$A_0J_0+A_1J_1+A_2J_2+A_3J_3+A_4J_4$

B position=$B_0J_0+B_1J_1+B_2J_2+B_3J_3+B_4J_4$

Miscellaneous Motion Control Parameters

Some additional parameters that can be set by the Motion Controller are—

DAC (digital analog converter) balance parameter
Maximum acceleration
Axis sense
Axis resolution
Maximum rotary RPM
Limit switch to marker pulse (index pulse)
Lead screw compensation table

Motion Controller Messages

The messages of the control system are objects, such as C++ objects. Each message object is transmitted in binary form to the receiving application's mailbox and then rebuilt into an object. This section describes the Motion Controller message verbs:

Run Update
Move StopRun
Wait Flush
Get StopWait

Modals establish a condition that persists until another modal changes it. The Motion Controller modals are—

OverrideEnable
MotionHoldEnable
IncrementalEnable
DecelType

These modals can also be used as one-shot modals within messages to temporarily set a modal value during the execution of the message and restore the mode prior to execution. The concurrent modal, used only as a one-shot modal, tells the system that a message is linked to the next message and that both must be executed as one. This could span more than one pair of messages.

Run

The Run messages are used with the StopRun messages to control the execution of the synchronous buffer. The Run message asks the Motion Controller to start executing messages from its queue.

Run<Qualifier>
Run RunAttribute <attribute>

The Run RunAttribute directs the Motion Controller to begin execution of the messages in the synchronous buffer.

attribute>none

SingleCycle The Run SingleCycle directs the Motion Controller to execute messages in the synchronous buffer a block at a time. Block are delimited by SingleCycleHeader messages.

Expected Responses

If the Motion Controller is able to begin execution of messages from the synchronous buffer, it responds with a Running Message. If the Motion Controller is not able to execute the messages from the synchronous buffer, it responds with a NotRunning message. The expected responses for any of the run commands are—

Running<Qualifier>
NotRunning <Qualifier>Description <errordescription>

StopRun

The StopRun message is sent to the Motion Controller to halt the execution of the message in the synchronous buffer. The motion can halt execution of message immediately (with controlled deceleration of motion) or at a block boundary. Block boundaries are delimited by Cycle Headers.

StopRun RunAttribute<attribute>

This StopRun message asks the Motion Controller to stop execution of the synchronous buffer.

StopRun RunAttribute <attribute> attribute>immediate deceleration motion at the maximum acceleration rate.

SingleCycle—stop execution at the first block end (singleCycleHeader) with out exceeding maximum acceleration.

Expected Responses

When the Motion Controller receives a StopRun message, it halts execution of the message in its synchronous buffer and responds with a StoppedRunning message (format below).

StoppedRunning <Qualifier>

Move

The Move message in the Motion Controller has two qualifters: Linear and Velocity. The Move message uses this basic structure:

Move<Qualifier> <attributes>

Move Linear

The Move Linear message directs the Motion Controller to move along a linear path. The path is defined by the position specified in the message from the end point of the previous move. The message structure is—

Move Linear<Position> <attribute>
Elements
<Position>XYZ
  XYZAB
  ZS
  S
<attribute>until switch<break|make>
  until probe<break|make>
  find index pulse
  override<enable|disable>
  motion hold<enable|disable>
  probe<enable|disable>
  <absolute|incremental>
  decel<type>
  concurrent
Sample Messages:
  Move Linear XYZ 10 11.1 12.0 untilSwitch break
  Move Linear XYZA 10.5 20.0 100.1 findIndexPulse
Expected Responses
NotMoving<Qualifier>
  <attributes>Description<errordescription>
Moving<Qualifier> <attributes>
Move VelocityMove
  The VelocityMove message asks the Motion Controller to move its axes at a specified velocity.
  Move VelocityMove<Velocity> <attribute>
  Elements
  <Velocity>XYZ XYZAB
XYZABS
S
<attribute>until switch<break|make>
   until probe<break|make>
   find index pulse
   override<enable|disable>
   motion hold<enable|disable>
   probe<enable|disable>
   decel<type>
   concurrent
      Expected Responses
Moving VelocityMove<Velocity> <attribute>
NotMoving                VelocityMove<Velocity>
   <attribute>Description
<errordescription>

Wait

A Wait message is usually sent to the Motion Controller's synchronous queue. The message asks the controller to not execute past this message until a StopWaiting message is sent.

Wait Message

Wait message<id>
Sample Messages:
   Wait message 1152
Expected Responses
   Waiting message<id>
   NotWait message<id>Description<errorDescription>

StopWaiting Message

The StopWaiting message is sent to the Motion Controller to cancel a Wait message.
StopWaiting message<id>
Expected Response
   StoppedWaiting message<id>

Update

An Update message is sent to the Motion Controller when an application wishes to change the value of a parameter.

Update Name <FieldName> DataType <Type> Value <Data>

| <FieldName> | <Type> | Description |
| --- | --- | --- |
| Feedrate | floatingpoint | Sets the value of the feedrate to be used by the following motion blocks |
| Override | floatingpoint | Set the value for the feedrate override. |
| OverrideEnable | EnableDisable | Enable or disables the effect of the feedrate override |
| MotionHoldEnabl | EnableDisable | Enable or disables the effect of MotionHold |
| Probe | EnableDisable | Enable or disables the ProbeInput |
| ZeroPosition | Position | Set the Zero for the coordinate system |
| Header | Header | The Update Header message allow the applications sending the messages to the Motion Controller to embed User Header information into the Queue. |

Expected Responses
   Updated Name <FieldName> DataType <Type> Value
      <Data>
   NotUpdated
      Name<FieldName>DataType<Type>Value
      <Data>Description<errorDescription>

Get

A Get message is sent to the Motion Controller when an application wishes to access information from the Motion Controller. The message allows the application to find and read motion control parameters and state variable and motion registers. These registers are—
Current position
Index position
Probe position
Commanded position
Velocity
Following Error Get Name Get Name
Get Name <FieldName> DataType <Type>

| <FieldName> | <Type> | Description |
| --- | --- | --- |
| Probe Position | Position | Holds the position of the axes at the last probe contact. |
| Index Position | Position | Holds the position of |

-continued

Get Name
  Get Name <FieldName> DataType <Type>

| <FieldName> | <Type> | Description |
|---|---|---|
| Current Position | Position | the axes at the last index pulse. Gets current position of the axis |
| Commanded Position | Position | Gets the commanded position of the axis |
| Following Error | Position | Gets the following error for the axis |
| Velocity | Velocity | Gets the velocity of the axis |
| Override | floatingpoint | Gets the value for the feedrate override. |
| OverrideEnable | EnableDisable | Indicates if Override is enabled. |
| MotionHoldEnabl | EnableDisable | Indicates if MotionHold is enabled. |
| Probe | EnableDisable | Indicates if Probe is enabled. |

Expected Responses
  Got Name<FieldName>DataType<Type>Value<Data>
  NotGotten Name<FieldName>DataType<Type>

Flush

The Flush message is sent to the Motion Controller when a application wants the Motion Controller to delete all of the messages from its synchronous message queue.

Flush<ProcessName>

Expected Responses
  Flushed
  NotFlushed

Motion Controller Notes

The following describes some of the control options which may be desired in the Motion Controller according to the present invention.

Calibration Sequence

The Motion Controller contains a programmable sequence of primitives which include:
  Move until not limit switch (off)
  Move until index pulse
  Move to index pulse
  Update position
  Update position offset Probing The Motion Controller's probing configuration includes:
  Move to position on probe head
  Move until not probe (off)

Logic Controller

The Kernel's Logic Controller (LC) is an engine that executes logic programs by scanning inputs, executing programs, and then writing outputs to operate the machine tool. The LC has these features:
  Executes ladder logic programs
  Executes GRAFCET programs
  Supports local or bussed I/O including CANbus and Pamux
  Programmable scan rate down to 20 milliseconds and dependent on the size of the program
  Programmable off-line or on-line
  Program using existing off-the-shelf products
  Supports on-line LC monitoring
  Supports on-line I/O monitoring
  On-line debugging
  Simulation
    Communicates through messages
    Supplies a window-based translator to convert common, logic control file formats into the LC file format
  Optional embedded Logic Controller in hardware with programmable scans down to 1 millisecond Logic Controller Messages The messages of the logic control are objects, such as C++ objects. Each message object is transmitted in binary form to the receiving application's mailbox and then rebuilt into an object. Three types of message can be sent to the Logic Controller:
  Synchronous queue control (Run, Stop)
  Send data (Update)
  Access data (Get)

When the Logic Controller receives user-defined messages, it stores them in its data table. Logic must be added to the ladder program to evaluate and execute the message. An example of a user-defined message appears in the following table:

| Type | Definition | Data |
|---|---|---|
| 1 | Tool changer | 1 - automatic, tool number<br>2 - retract<br>3 - extend |
| 2 | Coolant on/off | 0 - off, 1 - on |
| 3 | Enable servo power | |

Run

The Run messages are used with the StopRun messages to control the execution of synchronous buffer. The Run message asks the Logic Controller to start executing messages from its queue.

Run<Qualifier>
Run RunAttribute<attribute>
  The Run RunAttribute directs the Logic Controller to begin execution of the messages in the synchronous buffer.
  attribute>none
  SingleCycle The Run SingleCycle directs the Logic Controller to execute messages in the synchronous buffer a block at a time. Block are delimited by SingleCycleHeader messages.

Expected Responses

If the Logic Controller is able to begin execution of messages from the synchronous buffer, it responds with a Running Message. If the Logic Controller is not able to execute the messages from the synchronous buffer, it responds with a NotRunning message. The expected responses for any of the Run messages are—

Running<Qualifier>
NotRunning<Qualifier>Description<errordescription>

StopRun

The StopRun message is sent to the Logic Controller to halt the execution of the message in the synchronous buffer. The motion can halt execution of message immediately (with controlled deceleration of motion) or at a block boundary. Block boundaries are delimited by Cycle Headers.

StopRun RunAttribute<attribute>
   This StopRun message asks the Logic Controller to stop execution of the synchronous buffer. It uses this format—
StopRun RunAttribute<attribute>
   <attribute>immediate—deceleration motion at the maximum acceleration rate.
     SingleCycle—stop execution at the first block end (singleCycleHeader) with out exceeding maximum acceleration.

Expected Responses

When the Logic Controller receives a StopRun message, it halts execution of the message in its synchronous buffer and responds with a StoppedRunning message.

StoppedRunning<Qualifier>

Wait

A Wait message is usually sent to the Motion Controller in its synchronous queue. It asks the Motion Controller to not execute past this message until a StopWaiting message is sent.

Wait Message

Wait message<id>

Expected Responses

Waiting message<id>
NotWait message<id>Description <errordescription>
Sample Messages
Wait message 1152

StopWait Message

The StopWaiting message is sent to the Motion Controller to cancel a Wait message.
   StopWaiting message <id>
Expected Responses
   StoppedWaiting message<id>

Update

Update messages are sent to the Logic Controller by Application program to provide information to the ladder program. The message may update a flag in the Logic Controller data table, send a generic message, or provide a new ladder program to the Logic Controller.
   Update <Qualifier>
   Expected Response
The Logic Controller process Update messages at the beginning of its scan. It responds with a Updated message to indicate that the Update message was successfully executed. If the Logic Controller is not able to perform the Update, a NotUpdated Message is returned.

Updated <Qualifier>
NotUpdated <Qualifier> Description <errorDescription>

| | | |
|---|---|---|
| | Flag | Access Logic Controller data table by Names |
| | FlagID | Access Logic Controller data table by flag id |
| | LCMsg | Generic Logic Controller Message |
| | Program | Loads sections of the Logic control message |

Update Flag

The Update Flag message is used to change a value in the Logic Controller data table. These messages are interpreted at the beginning of each LC program scan. The Flag can be referenced through a Name or an ID.

Update Flag Name <FlagName> DataType <Type> Value

<FlagValue>

Update Flag ID<FlagID>DataType<Type>Value<FlagValue>
Update LCmsg
   The Update LCmsg is used to send a generic message to the Logic Controller. The actual message is interpreted by the ladder program.
Update LCmsg<msgType>Size<MsgSize>Value<msg>

Update Program

An application uses the Update Program message to down load ladder program messages to the Logic Controller. The Program is down loaded by breaking it up into segments and sending the segments to the Logic Controller. The "SequenceNumber" is used to make sure the program segments are received in order.
   Update Program ProgramID<ProgId>Sequence <SeqNumber>String<progSegment>

Get

An application sends a Get message to the Logic Controller when it wishes to access information from the Logic Controller's data table.

Get Flag Name<FlagName>DataType <Type>
Get Flag ID<FlagID>DataType<Type>

Expected Response

The Logic Controller responses to the Get messages at the end of each of the ladder program scans. The Got message is used to return the value of the requested flag. The NotGotten message indicates the requested flag was not defined.

Got Flag ID<FlagID>DataType<Type>Value<FlagValue>
NotGotten Flag ID<FlagID>DataType<Type>Description <errorDescription>

Ladder Logic Programming

The ladder logic programming environment gives the OEM off-line tools and a controller resident monitor to customize the LC. There are three components of the ladder logic programming environment:

Ladder Logic Programming Tool (off-line)

Ladder Logic Debug Tool (remotely hosted, serially linked)

Logic Monitoring Tool (controller resident)

The programming environment provides version control for the logic programs and back-up to any point in the changes. This feature also allows the OEM to branch off at a selected point and start new development paths for new machine strategies.

Programming Tool

An OEM can create and change ladder logic programs using familiar notation and concepts provided in the Ladder Logic Programming Tool. This tool gives the developer an easy-to-use off-line, graphical method for creating, editing, running, testing, and downloading logic control programs for the controller. With the tool the engineer can design control programs from initial concept to final operation using top-down design procedures. The following are programming tool's features:

Supports programming in ladder logic:
  Coils and Contacts
  Virtual Coils and Contacts
  Timers
  Counters
  Branches
Function Blocks for math (add, subtract, multiply, divide, trig.)
Function Blocks for interface to CNC
Output in "ANSI-C" source code form for cross-compile to target coprocessor board
Outputs a symbol table that may be read by other programs—useful for parameterization and creation of shared data tables
Supports programming in sequential function charts (GRAFCET SFCs)
Produces hard copies of program and data documentation
Supports programming in timing diagram form
Version control allows the integrator to make incremental changes with an audit trail

Ladder Logic Debugging Tool

The on-line debugging tool runs on a Windows workstation with a serial (RS232) link to the controller. This tool provides the following features:

Graphic illustration of the contacts and coils in the ladder program as they energize and de-energize
Ability to monitor and set values in the data table including counter and timer accumulators
Display of the GRAFCETsteps and transitions as they activate and deactivate
Ability to command the Logic Controller engine to execute one scan at a time

Logic Monitoring Tool

The real-time Logic Monitoring Tool gives the integrator a way to observe the states, inputs, and outputs of the machinery during cycling on the machine tool itself. The software allows the integrator to watch for timing problems in I/O, facilities debugging of logic sequences, and helps with machine wiring or switch adjustments.

The features of the Logic Monitoring Tool are listed below:

Incorporated into the CNC executive software system
Accessible though the CNC's platform diagnostic mode
Displays states of inputs and outputs in real-time
Allows the integrator to force the states of outputs and view the responses of the inputs
Reads from an alias file to attach symbolic names to I/O point definitions on the screen

Motion Control Hardware

The present invention System uses the aforementioned MATRIX4 multi-axis servo controller board. The system's approach to motion control maintains digital control throughout the position, velocity, and current loops as part of the CNC. As a result, the system achieves more precise, faster, and more robust closed loop control than other servo controls. Many control functions are isolated in the motion control software on the host computer. This approach give the user more flexibility when responding to changing industry needs. This also facilitates retrofitting a new CNC on existing machines. The MATRIX4 controller board is a fully digital, 4-axis position and velocity controller. The board provides constant velocity control as well as spindle orient capability. When coupled with the VECTOR4 daughter board, the system permits the CNC to control DC brush, DC brushless, and AC induction motors and permits most parameters to be programmed dynamically. Dynamic programming allows an engineer to update the motion control parameters immediately when there are changes in the environment or operating conditions.

Motion Control Configurations

Due to the system's configuration-flexibility, OEMs can use machines with multiple motors. This is possible because the CNC hides the motors from the application software by sending CNC messages through the power modules to maneuver the motors. This structure allows easy swapping of motors without drastic changes in the machine design.

For each controller board, an OEM can configure up to four axes with each axis independently supporting a different type of motor. Four boards can be used together to support up to 16 motors. The power modules between the CNC and the motors are inexpensive replacements for the proprietary drives common in many systems today. These modules can be purchased from many different suppliers.

Motion Control Software

The motion control software in the CNC translates part programming requests into basic position and velocity instructions. As shown in the illustration on the next page, the motion control software is divided into functional components. The operator uses the Part Program Interpreter (PPI) software to direct the motion of the axes. The PPI software may make use of pre-programmed, packaged cycles to perform common operations such as drill and tap.

The PPI sends requests to Process or Machine Objects. This software loads the requests and manual operations, such as tool change or coolant on/off, into shared memory.

The Interface Driver software has these functions:

Extracts and processes requests from shared memory

Interpolates motion lines

Performs leadscrew mapping

Sends position/velocity targets to the MATRIX4 board

The Interface Driver can accommodate simultaneous commands from the host to multiple DSPs. The driver software converts requests from the PPI into position and velocity targets that are fed to MATRIX4 through the Motion Interface. The driver also uses a "C" library and function prototypes to define commands for the MATRIX4 board.

The "C" library in the driver software defines the following:

Axis designators

Module designators

Multiple read parameter types

Disable interrupts masks

Servo modes of operation

Axes per module

Maximum number of axes per module

Output loop gains

Control Law indices

Control PID gain indices

Error codes

Maximum and minimum velocities and accelerations

Block transfer rate codes

Function prototypes

The motion control software also includes utilities to program the motor technology for the application. These utilities permit engineers to configure, tune, and maintain applications as well as document system performance.

The MATRIX4 board accepts the motion commands and closes the servo control loop. Since axes move by having voltages applied to them, the MATRIX4 board converts the position/velocity instructions into voltages (0 to 10 volts) and applies the voltages to the axes being controlled. The MATRIX4 board does not need to understand the machine tool's operation since that function is handled by the software.

Machine Configuration Library

The Machine Configuration Library provides default parameters for applications in a shared memory area. This service's responsibilities are to—

Load and distribute initialization parameters from the file system

Distribute parameters to applications

In one embodiment, this parameter library uses a C++ object, SystemVariables, to read and write data in the globally accessible shared memory area. The library also contains utilities to create, load the configuration, print, list, save, restore, and remove the information in the SystemVariables memory region.

The information in this section provides the details necessary for an engineer who wants to modify or develop new configuration programs. For more general information about these functions, refer to the "Platform Services" discuss herein.

Defining the Configuration File

In development work for this platform service, the first step is definition of the configuration file containing the system parameters. An ASCII file may be used to define the shared variable name, its size, and each data field in the shared memory. For example:

```
# This is an example configuration
# GT. 11/19/92
NAME /mnt/mydirectory/sharedfilename
SIZE 4096
SOF
```

| # NAME | TYPE | COUNT | SIZE |
|---|---|---|---|
| kTermsX | INTEGER | 4 | |
| kTermsY | INTEGER | 4 | |
| kTermsZ | INTEGER | 4 | |
| kTermsS | INTEGER | 4 | |
| iTermsX | INTEGER | 4 | |
| iTermsY | INTEGER | 4 | |
| iTermsZ | INTEGER | 4 | |
| iTermsS | INTEGER | 4 | |
| vTermsX | INTEGER | 4 | |
| vTermsY | INTEGER | 4 | |
| vTermsZ | INTEGER | 4 | |
| vTermsS | INTEGER | 4 | |
| i_limit | DOUBLE | 4 | |
| max_accel | DOUBLE | 4 | |
| pwm_freq | INTEGER | 4 | |
| lines | INTEGER | 4 | |
| poles | INTEGER | 4 | |
| hall | INTEGER | 4 | |
| deadband | INTEGER | 4 | |
| loopType | INTEGER | 4 | |
| motorParam | INTEGER | 4 | |
| field | INTEGER | 4 | |
| motor | INTEGER | 4 | |
| TravelLimits | DOUBLE | 3 | |
| Units | STRING | 1 | 7 |

The first two lines for the SystemVariables configuration file are comments beginning with the "#" sign. All keywords must be in capital letters in the file. The second line uses the NAME keyword to specify the name of the SystemVariables file. An absolute path name should be used. The third line specifies the size of the data area using the SIZE keyword. The size should be specified in 4K increments, even if the data space used is less than that. The SOF (start of fields) keyword must precede the defined fields.

The six supported field types are byte, string, double, integer, short integer, and long integer. The first column identifies the name of the field. Field names are limited to 30 characters plus a null terminator making it a total of 31 characters. The second column defines the field type, string, double and integer. There is no limit to the length of a string. The third column defines the number of elements to be stored for that field name. The example shows the field "kTermsX" to contain 4 integers, "TravelLimits" 3 doubles and "Units" 1 string containing 7 characters (including any null terminator).

At this time, the SIZE field is used only for the string data type. It indicates the length of the string (including null terminator).

Utilities

After creating a configuration file, the engineer needs to set up the memory area and load the configuration parameters. The library contains utilities to create the shared memory area, load the configuration, print, list, save, restore, and remove the information in the SystemVariables memory region. These utilities are—

SVsize
SVcreate
SVprint
SVloadConfig
SVlistData
SVsave
SVrestore
SVremove
SVshmdump These utilities are described in the order they are most commonly used beginning with the SVsize utility.

SVsize

The first utility an engineer may need, SVsize, establishes the size of the shared memory. In the example below the 4096 SIZE value provides enough space for the defined shared data area. The Total Bytes Used parameter indicates the total amount of space required for the shared data definition that the engineer specified. This figure must be increased up to the next 4K value and used as the SIZE parameter in the configuration file.

| Sizing | [/mnt/mydirectory/sharedfilename] |
|---|---|
| Size Indicated | [4096] |
| Header | [12] |
| Table | [1100] |
| Data | [431] |
| Total Bytes Used | [1543] |
| Available Bytes | [2553] |
| Size Completed. | |

SVcreate

After defining the shared data area, the engineer may create the shared data area using the SVcreate utility. Below is an example using this utility program.

```
Building..[/mnt/mydirectory/sharedfilename]
Size........[4096]
Shmid.....[/mnt/mydirectory/sharedfilename] created.
kTermsX
kTermsY
kTermsZ
kTermsS
iTermsX
iTermsY
iTermsZ
iTermsS
vTermsX
vTermsY
vTermsZ
vTermsS
i_limit
max_accel
pwm_freq
lines
poles
hall
deadband
loopType
motorParam
field
motor
TravelLimits
Units
Bytes Used......[1543]
```

-continued

Available Bytes.[2553]
Build Completed.

SVprint

Once the shared data area has been created, the engineer may display the data description using the SVprint utility. The SVprint utility displays the field name, data type (B, I, D, S, H, L) the count (number of elements) and the size of each String field. Below is an example showing integer (I), double (D) and string (S) data types. This utility also shows the size of each string field.

NAME......[/mnt/mydirectory/sharedfilename]
SIZE..........[4096]

| Name | Type | Count | Size |
|---|---|---|---|
| TravelLimits | D | 3 | |
| Units | S | 1 | 7 |
| deadband | I | 4 | |
| field | I | 4 | |
| hall | I | 4 | |
| iTermsS | I | 4 | |
| iTermsX | I | 4 | |
| iTermsY | I | 4 | |
| iTermsZ | I | 4 | |
| i_limit | D | 4 | |
| kTermsS | I | 4 | |
| kTermsX | I | 4 | |
| kTermsY | I | 4 | |
| kTermsZ | I | 4 | |
| lines | I | 4 | |
| loopTyp | I | 4 | |
| max_accel | D | 4 | |
| motor | I | 4 | |
| motorParam | I | 4 | |
| poles | I | 4 | |
| pwm_freq | I | 4 | |
| vTermsS | I | 4 | |
| vTermsX | I | 4 | |
| vTermsY | I | 4 | |
| vTermsZ | I | 4 | |

SVloadConfig

Next the engineer may load default values into the shared memory using the SVloadConfig utility. This utility uses an ASCII file describing the values assigned to each field. The format of the file follows:

These are the default values used for SharedVariable example programs.

| # FieldName | Index | Value |
|---|---|---|
| kTermsX | 0 | 7000 |
| kTermsX | 1 | 30000 |
| kTermsX | 2 | 12000 |
| kTermsX | 3 | 19400 |
| # | | |
| kTermsY | 0 | 0 |
| kTermsY | 1 | 20000 |
| kTermsY | 2 | 5000 |
| kTermsY | 3 | 7000 |
| # | | |
| kTermsZ | 0 | 2000 |
| kTermsZ | 1 | 18000 |
| kTermsZ | 2 | 3000 |
| kTermsZ | 3 | 5350 |
| # | | |

-continued

| kTermsS | 0 | 7000 |
|---------|---|------|
| kTermsS | 1 | 30000 |
| kTermsS | 2 | 12000 |
| kTermsS | 3 | 19400 |
| # | | |
| iTermsX | 0 | 0 |
| iTermsX | 1 | 15000 |
| iTermsX | 2 | 4000 |
| iTermsX | 3 | 0 |
| # | | |
| iTermsY | 0 | 0 |
| iTermsY | 1 | 28000 |
| iTermsY | 2 | 15000 |
| iTermsY | 3 | 0 |
| # | | |
| Units | 0 | Metric |

In the SVloadConfig utility, lines beginning with a # sign are interpreted as a comment. The first column specifies the field name while the second column is the index. The fields or indexes do not have to be defined in any specific order. The third column is the value. If a field cannot be found or a value is invalid, an error message is printed.

SVlistData

The engineer may list all the data values that are currently stored in the shared area using the SVlistData utility. This utility outputs a file that can be read using the SVloadConfig utility. The value for each field by index is printed.

SVsave

After modifying the data stored in the shared area, an engineer may want to save the information to disk. This can be done using the SVsave utility. Below is an example using this utility.

```
NAME......[/mnt/mydirectory/sharedfilename]
SIZE..........[4096]
Save Completed
```

The save utility saves the shared area under the filename specified in the configuration file with a .sav extension.

SVrestore

To restore a previously saved file, use the SVrestore utility. Below is an example using this utility:

```
NAME......[/mnt/mydirectory/sharedfilename]
SIZE..........[4096]
Restore Completed
```

SVshmdump

There is another utility, SVshmdump, that may be of interest for debugging the shared area at a very low level. This program dumps the shared area in hex bytes and is useful when the engineer wants to inspect the shared area.

Shared Memory Organization

The SystemVariables area can be described as a contiguous area of shared memory. This memory is divided into three sections:

Shared Memory Storage Header

Table of Contents

Data Storage

The header is divided into three fields:
  Number of fields defined in the shared area (first 4 bytes)
  Offset into the shared area (used when allocating space for new fields)
  An integer storing the semaphore handle (used to synchronize access to the data area only)

The header structure is as follows:

```
typedef header {
    int     number_of_fields;
    long    offset_into_datastorage;
    int     semaphore;
} header;
```

The second four bytes of the header contain a long integer (also four bytes) of the offset into the shared area. This value is used when allocating space for new fields in the shared area. In this scheme the table of contents (the field descriptions) grow downward while the data storage area grows upward. Finally, the header information contains an integer storing the semaphore handle used to synchronize access to the data area only. This means the semaphore is not used when getting information about the fields, but only for reading and writing into the data area.

Note: The byte sizes described in this document for integer and double reflect those of a 386 and 486 architecture.

The second section of the shared area is the table of contents. This area contains a series of field descriptions each can be described using this data structure:

```
#define [FIELD_NAME_LENGTH 31
typedef struct field_description
{
        char fieldname [FIELD_NAME_LENGTH];
        char type;
        unsigned int count;
        unsigned int size;
        unsigned int offset;
} field_description;
```

The first 31 bytes of each field description contains the field name. This is the same name that is used in the configuration file. At this time an upward limit of 31 characters (including Null terminator) is allowed. The next byte in the description indicates the field data type. The six field data types are represented by these letters:

B—byte

I—integer

D—double

S—string

H—short integer

L—long integer

The next four bytes describe an integer representing the number of elements to be stored under this name. This can be considered an index into an array beginning with the index zero for the first element. An integer representing the size of each element is stored after the count. Doubles use eight bytes and integers four, with user defined the string sizes. The final four bytes of the field description contains the offset from the beginning of the shared area into the data storage area where the stored values are kept for the field.

Writing a Program

An engineer wishing to write a program to access the shared memory area may want to examine the following example. This program simply creates a SystemVariables object, passing the configuration filename to the object. Calls are made to the SystemVariables object for getting the size, mapping the fields to field objects, getting and updating data, and other necessary actions.

SystemVariables Methods

The Machine Configuration Library uses an object, such as a C++ object, SystemVariables, to read and write data in the globally accessible shared memory area. The SystemVariables methods are defined below and the possible return values are listed for each method.

```
#include <stream.h>
#include "SystemVariables.hpp"
main (int argc, char *argv[])
{
        int       error;
        doubledoublevalue;
        if (argc < 2)
{
        cout << form("Usage: %s configuration-filename   n", argv[0]);exit (–
        1);
}
 /* Instantiate a SystemVariables object, specffying the configuration file
name to be used */
SystemVariables systemVariables(argv[1], error);
/* Check the error code returned from the constructor call */
 if (error)
 {
   perror ("SystemVariables Constructor");
   exit (–1);
}
 /* The Size method call is one of many calls that will return information
about the shared area */
if (systemVariables.Size() == 0)
    {
     perror ("Invalid size");
     exit (–1);
    }
/*
   Here is a simple call to get the value stored in the 0th index of the field
called "max_accel".
*/
    error = systemVariables.Get("max_accel", doublevalue, 0);
    cout << form ("max_accel value [%f]   n",doubleValue);
/*
    Finally, close the connection to the owed data area.
*/
 if ((error = systemVariables.Close()))
 {
   perror ("Cannot close shared area!");
 }
}
```

Below is the make file used to compile and link this program:

```
CFLAGS=-X –I/usr/local/include
OBJ=./
EXE=../
LIB=/usr/local/lib/
OFILES= $(OBJ)example.o
$(EXE)example: $(OFILES)
  g++ –X $(OBJ)example.o $(LIB)libSV.a-o $(EXE)example
$(OBJ)example.o : example.cc
  g++ –c $(CFLAGS) example.cc –o $(OBJ)example.o
```

The SystemVariables methods are described in the following section.

BasePtr

This class method returns the base pointer to the shared area. The function prototype for this method is—
  char *BasePtr ( )
  Return Values:
  A non Null pointer on success.

Close

This class method closes a connection to the shared area. The function prototype for this method is—
  int Close ( )
  Return Values:
  0—Success
  –1—Error. Check "Errno" for a description of the error.
An error may occur during an unmap call of the shared area or a close call to the shared area file. Errno is set when these errors occur.

Description

This class method returns a character string describing the field. The string contains the field name, type, count and size (in case of string types). The calling program must perform a delete on the returned description. The application may use the Field or GetField method calls to obtain the Field parameter used in this call. The function prototype for this method is— int Description (svField &field, char *description) See Also: GetField, Field

Field

This method finds the Field for the field specified by fieldName. The function prototype for this method is— int Field (char *fieldName, svField &field)
Return Values:
0—Success
-2—Cannot find field.
-3—Shared Area Not Initialized. See Also: Get, Update.

FieldCount

This method gets the number of elements for the field specified by fieldName. The count is returned in the parameter count. The function prototype for this method is— int FieldCount (char *fieldName, int &count)
Return Values:
0—Success
-2—Cannot find field.
-3—Shared Area Not Initialized.

FieldSize

This method gets the size of the field specified by field-Name. The size is returned in the parameter size. The function prototype for this method is— int FieldSize (char *fieldName, int &size)
Return Values:
0—Success
-2—Cannot find field.
-3—Shared Area Not Initialized.

FieldType

This method gets the data type for the field specified by fieldName. The type returned in the parameter type is I for integer, D for double, S for string, B for byte, H for short integer, and L for long integer. The function prototype for this method is— int FieldType (char *fieldName, char type)
Return Values:
0—Success
-2—Cannot find field.
-3—Shared Area Not Initialized.

FileName

This class method returns the configuration filename used to define the shared data area. The function prototype for this method is— char *FileName( )

Get

This method retrieves the value stored for a given field by name.

int Get (char *fieldName, int &data, int index)
int Get (char *fieldName, char *data, int index)
int Get (char *fieldName, double &data, int index)

The index parameter is optional. If it is not used, the 0th index is searched. Care must be taken when getting string values. The engineer must make sure the character pointer that is passed into this method has allocated enough space to store the character string. A good way to do this is to use the FieldSize method to get the size of the character string. Then allocate the space before calling this method.
Return Values:
0—Success,
-1—Invalid field type.
-2—Field not found.
-3—Shared Area Not Initialized.
-4—Invalid Index.

The Get method also retrieves the value stored for a given field as specified by the sfField reference.

int Get (sfField &field, int &data, int index)
int Get (sfField &field, char *data, int index)
int Get (sfField &field, double &data, int index)

The Field pointer is found using the Field or GetField methods.

The engineer must make sure the character pointer that is passed into this method has allocated enough space to store the character string. A good way to do this is to use the FieldSize method to get the size of the character string. Then allocate the space before calling this method.
Return Values:
0—Success,
-1—Invalid field type.
-3—Shared Area Not Initialized.
-4—Invalid Index See Also: Field, GetField, FieldSize.

GetField

This method call is used to traverse the list of fields in the shared area. By using a zero in the parameter data you will begin at the top of the list. After each call the data parameter will be incremented. The list can be traversed by calling this method successively until a return value of -1 is return. The function prototype for this method is— int GetField (svField &field, int &data)
Return Values:
0—Success
-1—End of list.
-3—Shared Area Not Initialized. See Also: Get, Update.

Name

This class method returns the shared area name specified in the configuration file. The function prototype for this method is— char *Name ( )

NumberOfFields

This class method returns the number of fields defined for the SystemVariables. The function prototype for this method is— int NumberOfFields( )

Remove

This class method will remove the shared area completely. After this call no other applications will be able to access the shared area. The function prototype for this method is— int Remove ( )
Return Values:
0—Success
−1—Error occurred during an unmap call or close call to the shared area file. Check errno for a description of the error.
−3—Shared Area Not Initialized.
−4—Cannot unlink the shared area file.
−5—Cannot unlink the shared area semaphore.

Save

This class method will save a copy of the shared area to disk. The file name will use the shared memory name with a suffix of save. The function prototype for this method is— int Save ( )
Return Values:
0—Success
−1—Cannot open the save file.
−3—Shared Area Not Initialized. Refer to the description of the "Restore" method for more information.

Restore

This method will restore a saved copy of the shared area. When using the Save and Restore methods a filename with the .sav extension is used. The function prototype for this method is— int Restore( )
Return Values:
0—Success
−1—Cannot open the restore file.
−3—Shared Area Not Initialized.
The Save and Restore methods use the shared area name with a .sav extension appended to it as a filename for saving and restoring a shared area. The file is saved in a binary format and can only be read using the Restore call. Use the SVlistData utility program to create an ASCII readable file of the current field values.

Size

This class method returns the total size in bytes of the shared area (not the amount of shared area being used). The function prototype for this method is— int Size( )

Update

The Update method replaces the value stored for a given field with the value given in data.

int Update (char *fieldName, int data, int index)
int Update (char *fieldName, char *data, int index)
int Update (char *fieldName, double data, int index)
the index parameter is optional. If it is not specified the 0th index is used. When updating a string field type the field size will limit the number of characters stored. For example, if you have a character string of thirty characters and you update a field that can only hold twenty, only the first twenty characters will be stored.

Return Values:
0—Success,
−1—Invalid field type.
−2—Field not found.
−3—Shared Area Not Initialized.
−4—Invalid Index The Update method also replaces the value stored for a given field as specified by the sfField reference.

int Update (sfField &field, int data, int index)
int Update (sfField &field, char *data, int index)
int Update (sfField &field, double data, int index)
The Field pointer can be found using the Field or GetField methods.

Return Values:
0—Success,
−1—Invalid field type.
−3—Shared Area Not Initialized.
−4—Invalid Index See Also: Get, Field. GetField.

Semaphore

This method returns the semaphore handle used to synchronize access to the shared area. The function prototype for this method is— int Semaphore ( )

PostSemaphore

This method call will release the semaphore used to synchronize access to the shared area. You must use the WaitSemaphore method call to get the semaphore before calling this method. The function prototype for this method is— void PostSemaphore ( )

WaitSemaphore

This method call will get the semaphore used to synchronize access to the shared area. The call will pend until it can get the semaphore. The function prototype for this method is— void WaitSemaphore ( )

The WaitSemaphore and PostSemaphore calls are used to allow a program to get access to the shared area and make several calls without the overhead of getting and releasing the semaphore with each get/update call. This call should be used in conjunction with the PostSemaphore method call. In some cases an application may want to update or get data for a group of fields without having to get the semaphore for each call.

In this case the application would make a call to WaitSemaphore, then update/get data for all the fields followed by a PostSemaphore call. Care must be taken when performing this call so as not to hold up other processes for too long a period. This method will save 35 microseconds from each get/update call.

SVfield Methods

The SystemVariables class uses an SVfield class to describe each field within the SystemVariables. To get a reference to individual fields, use the GetField or Field method calls in the SystemVariables class. By getting an SVfield reference, the engineer greatly improves the efficiency of accessing fields in the SystemVariables because this eliminates the search for the individual field. In addition, this provides information about individual fields by making calls to the SVfield class methods. This section describes the SVfield class method calls.

Name

This class method returns the name of the Field. Field names are currently limited to 31 characters including the Null terminator. The function prototype for this method is— char *Name ( )

Type

This class method returns the field data type. The return value may be I (integer), D (double), S (string), B (byte), H (short integer), or L (long integer). The function prototype for this method is— char Type ( )

Count

This class method returns the number of elements that may be stored under this field name. Elements are numbered beginning with 0. For example, an integer field with a count of five may be accessed using an index from 0 to 4. The function prototype for this method is— int Count ( )

Size

This class method returns the size of each field element. Under the Lynx OS (for 386/486 systems) integers and doubles are stored in four bytes, strings are stored by any size. For example, a string field with a count of seven and a size of ten means there are seven character strings of length ten (including the Null terminator). The function prototype for this method is— int Size ( )

Exception Reporter

The error codes used to filter error messages are available in the file "ErrorCodes.hpp." This file may be modified and expanded to meet the customer's needs.

```
#ifndef_ERRORCODESHPP
#define_ERRORCODESHPP

# FileName: ErrorCodes.hpp

# $Header$
# $Log$

static char *ERRORCODESHPPRC string = "$Header$";
typedef enum ExceptionSeverityValues
{
        NO_SEVERITY    = 0x0000,
        INFORMATION    = 0x0001,
        WARNING        = 0x0002,
        FATAL          = 0x0004,
        All_SEVERITIES = 0x0007,
}       ExceptionSeverityValues;
typedef enum ExceptionCategoryValues
{
        NO-CATEGORY      = 0x0000,
        MOTION           = 0x0001,
        LOGIC_CONTROL=   0x0002,
        DEVICE_LAYER =   0x0004,
        DIRECTORY_SERVICE = 0x0008,
        RESERVED_10      = 0x0010,
```

```
        RESERVED_20    = 0x0020,
        RESERVED_40    = 0x0040,
        RESERVED_80    = 0x0080,
        USER_DEFINED_01        = 0x0100,
        USER_DEFINED_02        = 0x0200,
        USER_DEFINED_04        = 0x0400,
        USER_DEFINED_08        = 0x0800,
        USER_DEFINED_10        = 0x1000,
        USER_DEFINED_20        = 0x2000,
        USER_DEFINED_40        = 0x4000,
        USER_DEFINED_80        = 0x8000,
        ALL_CATEGORIES         = 0xFFFF,
} ExceptionCategoryValues;
typedef enum ErrorCodes
{
        EX_NO_ERROR,
        EX_NOT_FOUND,
        EX_REPLACE_ME_001,
        EX_REPLACE_ME_002,
        EX_REPLACE_ME_003,
        EX_REPLACE_ME_004,
}
```

Machine Class Creating a New Machine Class

Creating a completely new Machine Class is a more complex process than simply modifying an existing Machine Class. A customer may create a new Machine Class for one of the following reasons:

- Existing Machine Classess do not contain the objects needed to operate the customer's extremely specialized machine
- The customer wants to replace the messaging interface.
- The customer has a specialized Kernel and needs to develop a Machine Class to communicate with it.

As with all development efforts there are two main stages: preparation and development.

Preparation

To prepare for development of a completely new Machine Class, the customer should analyze the target machine tool to identify all of its devices.

The customer must also identify the system tools to assist in this effort. Some of these tools are—

- OS utilities
- ANSI C compiler
- C++ programming features (compiler, inheritance of object characteristics, and isolation of changes)
- UNIX-based development tools The customer needs to become familiar with two important control system components:

- Well-documented Kernel interface including message parameters and Logic Controller flags (in this manual)
- Full source code for the sample, generic Machine Class An understanding of these two components simplifies the development effort by helping the customer to connect the new Machine Class to existing Kernel functions.

Development Steps

The steps a developer should follow when creating a new Machine Class are as follows:

1. After a thorough analysis of the target machine, name all of the devices needed to operate the machine. These become the new Machine Class objects.
2. Identify all of the methods used by each device. It is often helpful to use the same verbs as those used by existing Machine Class objects. In that way, the developer can connect and use the existing messages.

3. Match the available Kernel functions to the new Machine Class objects. Create new messages where needed.

The Appendix includes representative source code which may be useful to programmer to create and use a CNC control system in accordance with the present invention. However, it should be understood that variations in the source in the appendix will likely be appropriate to accommodate the design of the particular CNC machine tool with which it is used. Moreover, those of skill in the art will appreciate that many variations to the invention as described herein may be made without departing from the spirit and scope of the invention, and such variations are with scope of the below claims.

What is claimed is:

1. A CNC machine tool control system for a CNC machine tool of the type comprising a controllable, movable tool for shaping a workpiece, means for receiving control instructions describing shaping functions to be performed on the workpiece, a processing unit and memory means, comprising:

means for receiving and storing in the memory means workpiece shaping instructions;

means for transmitting command signals to a movable tool to thereby cause the movable tool to move; and means for generating control signals, said generating means including an object oriented software program comprising a plurality of objects, each said object including a plurality of instructions and associated data, said generating means including message means for transmitting information between said objects, at least one of said objects including a model of a shaping process to be performed on a workpiece by the movable tool, said generating means coupled to said message means, said generating means generating control signals responsive to messages from said shaping objects, said generating means communicating said control signals to said transmitting means.

2. The CNC machine tool control system of claim 1 wherein at least one of said objects may be dynamically allocated in the memory means.

3. The CNC machine tool control system of claim 1 wherein at least one of said objects comprises a model of a movable tool for shaping a workpiece, and wherein at least one of said movable tool objects exchanges messages with at least one of said shaping process objects.

4. The CNC machine tool control system of claim 3 wherein said shaping object includes a software procedure specifying messages said shaping object needs to send to one of said movable tool objects to complete the shaping process.

5. The CNC machine tool control system of claim 1 wherein at least one of said objects comprises a location object including information about the location on the workpiece where a process is to be performed, and wherein a shaping process object is associated with said location object.

6. The CNC machine tool control system of claim 1 further including first and second objects each comprising a model of a shaping process to be performed on a workpiece, and wherein said second object includes at least one instruction which is inherited from said first object.

7. The CNC machine tool control system of claim 1 wherein at least one of said shaping objects comprises a model of a hole-making process capable of forming a hole in a workpiece, the model of the hole-making process including definitions of the X, Y and Z dimensions of the hole.

8. The CNC machine tool control system of claim 1 wherein at least one of said shaping objects comprises a model of a milling process capable of being formed in a workpiece, the model of the milling process object including a two-dimensional definition of a shape.

9. The CNC machine tool control system of claim 8 wherein the model of the milling process object further includes information representing whether the defined shape is to be removed from the workpiece or left remaining as a form in the workpiece.

10. The CNC machine tool control system of claim 1 wherein at least one of said objects comprises a model of a contouring process capable of being performed on a workpiece being turned in a lathe.

11. The CNC machine tool control system of claim 1 wherein said generating means includes status means for indicating whether a process defined by one of said objects has been performed on a workpiece.

12. The CNC machine tool control system of claim 1 wherein said generating means includes sequence storing means for indicating the order in which a process represented by one of said objects should be performed relative to other of said objects representing other processes to be performed.

13. The CNC machine tool control system of claim 1 wherein at least one of said objects comprises a composite object of multiple instances of another object representing a process, the composite object further including physical coordinate information regarding the locations on the workpiece in which each instance of the process is to occur.

14. A CNC machine tool control system for a CNC machine tool of the type comprising a controllable, movable tool for shaping a workpiece, means for receiving control instructions describing shaping functions to be performed on the workpiece, a processing unit and memory means, comprising:

means for receiving and storing in the memory means workpiece shaping instructions;

means for transmitting command signals to a movable tool to thereby cause the movable tool to move; and means for generating control signals, said generating means including an object oriented software program comprising a plurality of objects, each said object including a plurality of instructions and associated data, said generating means including message means for transmitting information between said objects, at least one of said objects including a model of a movable tool for use in connection with shaping a workpiece, said movable tool objects including instructions and data relating to functions of a movable tool, said generating means coupled to said message means, said generating means generating control signals responsive to messages from said movable tool objects, said generating means communicating said control signals to said transmitting means.

15. The CNC machine tool control system of claim 14 wherein at least one of said objects comprises a model of a shaping process to be performed on a workpiece by the movable tool, and wherein at least one of said movable tool objects exchanges messages with at least one of said shaping process objects.

16. The CNC machine tool control system of claim 14 wherein said generating means includes status means for indicating whether one of said movable tool objects is in use by a another object.

17. The CNC machine tool control system of claim 14 wherein the system comprises first and second objects each comprising a model of a movable tool for shaping a workpiece, and wherein said second object includes at least one instruction inherited from said first object.

18. The CNC machine tool control system of claim 14 wherein at least one of said objects comprises a model of a tool capable of forming a hole in the workpiece and the size of the hole formed by the tool.

19. The CNC machine tool control system of claim 14 wherein at least one of said objects comprises a model of a tool capable of milling a workpiece and the size of the tool.

20. The CNC machine tool control system of claim 14 wherein at least one of said objects comprises a model of a movable table on which a workpiece may be mounted and coordinate data regarding the position of the table.

21. The CNC machine tool control system of claim 14 wherein at least one of said objects comprises a model of a tool changer and includes descriptions of a plurality of tools.

22. The CNC machine tool control system of claim 14 wherein at least one of said objects comprises a model of a rotatable spindle capable of receiving a tool, said spindle object including means for storing information regarding whether a spindle is rotating.

23. The CNC machine tool control system of claim 14 wherein at least one of said objects comprises a model of an operator interface console through which an operator may utilize the CNC machine tool control system.

24. The CNC machine tool control system of claim 14 further comprising:
   a motion controller module for receiving messages from said objects indicating desired movements of a movable tool and sending command signals to the movable tool to cause the movable tool to move in accordance with the desired movements.

25. The CNC machine tool control system of claim 24 wherein said movable tool object periodically sends a message to said motion controller module requesting information regarding the location of the movable tool.

26. The CNC machine tool control system of claim 24 wherein said motion controller module includes storage means for storing locations of movable tools, and wherein said motion controller module provides a message including location coordinates in response to messages from said movable tool objects inquiring about the current coordinates of the machine tool represented by said movable tool object.

27. The CNC machine tool control system of claim 24 wherein:
   at least one of said movable tool objects includes a model of a rotatable spindle capable of receiving a tool, said spindle object including means for storing information regarding whether a spindle is rotating;
   at least one of said objects comprises a model of a movable table on which a workpiece may be mounted and coordinate data regarding the position of a table; and said system further comprising:
   a composite object comprised of said rotatable spindle object and said table object, said composite object including software means for simultaneously coordinating the relative positions of the spindle and the table using said rotatable spindle object and said table object.

28. A CNC machine tool control system for a CNC machine tool of the type comprising a controllable, movable tool for shaping a workpiece, means for receiving control instructions describing shaping functions to be performed on the workpiece, a processing unit and memory means, comprising:
   means for receiving and storing in the memory means workpiece shaping instructions;
   means for transmitting command signals to a movable tool to thereby cause the movable tool to move;
   an object oriented software program comprising a plurality of objects, each said object including a plurality of instructions and associated data, each of said objects carrying out operations with respect to a corresponding concept and exchanging, with other said objects, messages indicative of what operation should be carried out or a status of said sending object;
   a motion controller software module for receiving messages from at least one of said plurality of objects, the received messages including commands indicating desired movements of a movable tool; and
   said motion controller software module further comprising means for sending command signals to said transmitting means to thereby cause the movable tool to move.

29. The CNC machine tool control system of claim 28 wherein said motion controller software module includes means for sending object oriented messages to a plurality of said objects.

30. A CNC machine tool control system for a CNC machine tool of the type comprising a controllable, movable tool for shaping a workpiece, means for receiving control instructions describing shaping functions to be performed on the workpiece, a processing unit and memory means, comprising:
   means for receiving and storing in the memory means workpiece shaping instructions;
   means for transmitting command signals to a movable tool to thereby cause the movable tool to move;
   an object oriented software program comprising a plurality of objects, each said object including a plurality of instructions and associated data, each of said objects carrying out operations with respect to a corresponding concept and exchanging, with other of said objects, messages indicative of what operation should be carried out or a status of said sending object;
   a motion controller software module operatively associated with said transmitting means and comprising means for receiving from movable tools signals indicating faults with a movable tool;
   a device fault software module comprising:
      means for storing information regarding detected faults from movable tools;
      means for storing, for each detected fault, a sublist of said objects to which to send an object oriented message identifying the detected fault; and
      means for sending, upon receiving information regarding a movable tool fault, an object oriented message to each said object associated with the fault.

31. The CNC machine tool control system of claim 30, wherein said object oriented messages sent by said device fault software module are sent via said object oriented software program.

32. The CNC machine tool control system of claim 30, wherein said messages sent by said device fault software module are sent through a call to an operating system to another program.

33. A CNC machine tool control system for a CNC machine tool of the type comprising a controllable, movable tool for shaping a workpiece, means for receiving control instructions describing shaping functions to be performed on the workpiece, a processing unit and memory means, comprising:

means for receiving and storing in the memory means workpiece shaping instructions;

means for transmitting command signals to a movable tool to thereby cause the tool to move;

an object oriented software program comprising a plurality of objects, each said object including a plurality of instructions and associated data, said objects including a plurality of transmitting objects and a plurality of receiving objects, said object oriented software program including message means for transmitting a plurality of messages to said receiving objects from said transmitting objects, and wherein at least one of said objects comprises a motion control object capable of receiving object oriented messages from other of said objects specifying motion operations to be performed by a movable tool, the motion control object operably associated with said command signal transmitting means.

34. The CNC machine tool control system of claim 33 wherein said motion control object further comprises:

means for receiving fault signals from a movable tool; and means for sending an object oriented message to another of said objects in the control system identifying the received fault signal.

35. A method of operating a control system for a CNC machine tool control system of the type comprising a controllable, movable tool for shaping a workpiece, means for receiving control instructions describing shaping functions to be performed on the workpiece, a processing unit and memory means, the method comprising the steps of:

providing an object oriented software system comprised of a plurality of objects, each said object including a plurality of instructions and associated data, said objects being capable of receiving and transmitting messages to other of said objects in the system, and wherein:

at least one of said objects comprises a shaping process object comprising a model of a process to be performed on a workpiece by a movable tool;

at least one of said objects comprises a movable tool object comprising a model of a movable tool capable of shaping a workpiece;

the object oriented software system includes motion control means for receiving an object oriented message containing movable tool motion information and transmitting motion commands to a movable tool to cause the movable tool to move in accordance with the motion information;

receiving workpiece shaping information and storing the workpiece shaping information in one of said shaping process objects;

transmitting an object oriented message from a shaping process object to a movable tool object; and transmitting an object oriented message from a movable tool object to the motion control means, to thereby send a command signal to a movable tool and cause a workpiece to be shaped by the movable tool.

36. The method of claim 35 wherein said shaping process object is dynamically allocated in memory.

37. The method of claim 35 wherein said shaping process object includes embedded software commands identifying one of said movable tool objects to which a message is sent.

38. The method of claim 35 wherein the object oriented software system operates in conjunction with a real time multitasking operating system.

* * * * *